(12) United States Patent
Sennett et al.

(10) Patent No.: US 9,774,746 B1
(45) Date of Patent: Sep. 26, 2017

(54) ADVANCED CONFERENCE CALL CONTROLS

(75) Inventors: DeWayne Allan Sennett, Redmond, WA (US); Brian Kevin Daly, Seattle, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 2429 days.

(21) Appl. No.: 11/695,719

(22) Filed: Apr. 3, 2007

(51) Int. Cl.
*H04M 7/12* (2006.01)
*H04M 7/00* (2006.01)

(52) U.S. Cl.
CPC ......... *H04M 7/1245* (2013.01); *H04M 7/124* (2013.01); *H04M 7/006* (2013.01); *H04M 7/1205* (2013.01); *H04M 7/1285* (2013.01)

(58) Field of Classification Search
CPC .... H04M 7/1245; H04M 7/124; H04M 7/006; H04M 7/1205; H04M 7/125; H04M 7/1285
USPC ............. 370/352, 260, 261; 379/158, 202.01
See application file for complete search history.

(56) References Cited

U.S. PATENT DOCUMENTS

| | | | |
|---|---|---|---|
| 4,691,347 A * | 9/1987 | Stanley | H04M 3/56 379/203.01 |
| 6,438,585 B2 * | 8/2002 | Mousseau | G06Q 10/107 340/7.21 |
| 7,058,067 B1 * | 6/2006 | Corley et al. | 370/408 |
| 2002/0090947 A1 * | 7/2002 | Brooks et al. | 455/436 |
| 2002/0097708 A1 * | 7/2002 | Deng | 370/352 |
| 2003/0194072 A1 * | 10/2003 | MacNamara | H04M 3/569 379/202.01 |
| 2004/0008670 A1 * | 1/2004 | Deng | 370/352 |
| 2004/0028200 A1 * | 2/2004 | Carlson | H04M 3/56 379/201.01 |
| 2004/0203677 A1 * | 10/2004 | Brown et al. | 455/416 |
| 2004/0223464 A1 * | 11/2004 | Dye | H04L 12/1818 370/260 |
| 2004/0235509 A1 * | 11/2004 | Burritt et al. | 455/519 |
| 2005/0025177 A1 * | 2/2005 | Huckett et al. | 370/466 |
| 2006/0270447 A1 * | 11/2006 | Everson et al. | 455/552.1 |
| 2007/0064898 A1 * | 3/2007 | Amano | H04M 3/53383 379/168 |
| 2007/0253348 A1 * | 11/2007 | Sammarco | 370/260 |

* cited by examiner

*Primary Examiner* — Khaled Kassim
(74) *Attorney, Agent, or Firm* — Amin, Turocy & Watson, LLP

(57) ABSTRACT

A system and method is disclosed for providing a conference call and enhanced conference call controls for traditional, for example circuit switched-only, and advanced, for example packet switched and dual circuit and packet switched, communication devices. The system includes components for receiving, transcoding, and distributing communication protocols from any suitable public, commercial, or otherwise known communication protocol source or architecture. In addition, the system includes components for dynamically transferring host control functions from one conference call participant while maintaining a conference call communication bridge, as well as components for maintaining a conference call communication bridge should a conference call host device become inadvertently disconnected.

23 Claims, 17 Drawing Sheets

ADVANCED CONFERENCE CALL CONTROLS

BACKGROUND

As long distance communication networks have matured, larger numbers of individuals have been able to communicate with each other simultaneously. Conference phone calls are one example of this simultaneous communication capability. Originally, conference calls were conducted by way of traditional telephone lines. This type of connection limited a number of people who could be engaged in conversation at one time, limited a type of instrument that could connect them, and limited mobility of devices during a conference call. Since the advent of advanced broadband and mobile communication protocols, however, individuals have been able to communicate with voice and data signals simultaneously through use of small mobile devices. Instead of being limited to voice communication only, communication networks and their associated devices have capabilities to stream data between communication devices. Examples such as real-time steaming video, text chat, document sharing, simultaneous video and data sharing currently are available through advanced communication networks and network protocols. Moreover, because communication platforms can be synchronized, more people are able to participate and are less restricted by their current location or means of communication during conference calls.

An introduction of these advanced communication networks has consequently led to a demand for interconnecting devices operating on advanced networks with devices operating on traditional networks to facilitate conference calls. Communication protocols on these advanced networks are not compatible with conventional networks however, so conferencing between advanced and traditional network protocols has not been possible.

Furthermore, traditional conference calling requires a $3^{rd}$ party "operator", not associated with the call, to act as host for the meeting. This $3^{rd}$ party initiates a communication bridge to support the conference call and moderates the individuals participating in the call. Individuals call into the $3^{rd}$ party host to be interconnected to other individuals by way of the communication bridge. Equipment is available to enable the actual participants of a conference call to host the call, but a $3^{rd}$ party is still required to carry out most moderator functions, for instance muting participants engaged in disruptive side conversations, muting connections with excessive static interference and disconnecting participants who have forgotten to disconnect their own connection.

In general, few basic management and moderation functions are available to the participants of a conference call, whether they host the conference call or not. For instance, it can be cumbersome for participants to determine who is actively connected to the call at a given time. Each individual must specifically announce their presence as they are added to the conference call or others will be unaware of their participation. Moreover, each speaker must announce their identity as they begin speaking, unless all other participants already recognize the voice of that speaker. Finally, a host is required to remain connected with the communication bridge for the communication bridge to exist; if the host is ever disconnected, all participants are disconnected as well.

SUMMARY

The following presents a simplified summary of the disclosure in order to provide a basic understanding of some aspects of the full written description. This summary is not an extensive overview of the disclosure. It is not intended to identify key/critical elements of the specification or to delineate the scope of the innovation. Its sole purpose is to present some concepts of the specification in a simplified form as a prelude to the more detailed description that is presented later.

Briefly described, aspects of the subject disclosure relate to facilitating the interconnection of conventional and advanced communication devices into a conference call. The conference call can take place on a conference call server that can interconnect traditional, e.g., circuit switched-only voice communication devices, with advanced devices that are not limited to circuit switched-only communication protocols. The conference call server can have a network bridge component that can interconnect circuit switched voice communication network devices and advanced communication devices, e.g., communication devices not limited to circuit switched-only communication, communication devices that can simultaneously utilize circuit switched and non-circuit switched communication, and devices that can utilize communication protocols allowing for simultaneous voice and data communication.

A network bridge component can further receive, translate, and distribute incoming communication signals output by advanced and conventional communication devices over advanced and conventional communication networks. Examples of conventional voice communication networks include Public Switched Transport Networks (PSTN), Global System for Mobile communication (GSM) networks, Code Division Multiple Access (CDMA) and Universal Mobile Telecommunication System (UMTS) networks. Examples of advanced communication networks include wired or wireless Internet Protocol (IP) networks such as Voice over Internet Protocol (VoIP) networks, IP Data networks, and other communication networks that can provide simultaneous streaming voice and data communication. The conference call server includes the communication protocols for public communication networks. By referencing these communication protocols the communication bridge can receive, translate, and distribute an inbound communication signal from various devices connected over one communication network to other devices connected over other communication networks.

Furthermore, embodiments of the subject disclosure relate to providing enhanced controls for a conference call. Consequently, a participant may function as the conference call host. As conference call host, a participant may initiate, moderate and terminate the conference call without need of a $3^{rd}$ party operator. Examples of moderator functions include, but are not limited to, muting and un-muting a connected device, disconnecting a device, and transferring host functions to another capable device. Additionally, a conference call host need not remain connected to the communication bridge for the conference call to continue. If a host disconnects, intentionally or inadvertently, the communication bridge remains and another participant is automatically appointed conference call host. The communication bridge terminates only when a host specifies so, or all conference call participants disconnect.

Integration of advanced and conventional network devices disclosed herein gives conference call participants controls heretofore unavailable with conference calls. Participants may simultaneously stream video, text, and other data communication applications, and initiate sidebar communication channels with the host and other participants during a conference call. A user interface display can indicate identity, location, and status of all expected and connected participants. Participant status can include, e.g., speaker identity, identity of the current host, which participants are muted, and which participants are utilizing simultaneous audio and data communication features. Moreover, participants may utilize enhanced controls by way of their own communication device. The host is not required to establish conference call controls between participants.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
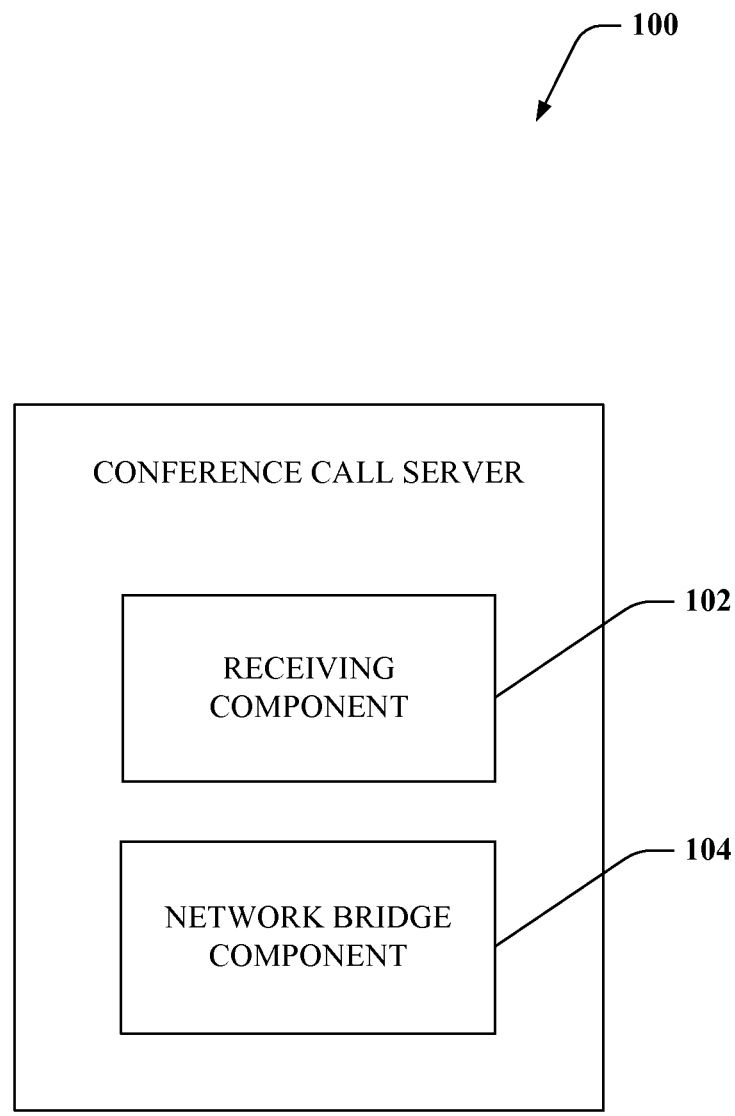
FIG. 1 depicts an example high-level system for connecting voice telephone calls placed over traditional and advanced communication networks into a single conference call.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

FIG. 1 depicts a conference call server 100 that can receive incoming phone calls at a receiving component 102 and interconnect received calls by way of a network bridge component 104. Network bridge component 104 can interconnect, or bridge, calls incoming by way of traditional and advanced communication networks and is preinstalled and/or preprogrammed with all necessary protocol information required to transcode and distribute data incoming on a first network utilizing a first protocol to all other connected networks utilizing other protocols.

Traditional communication networks can include, e.g., a public switched telephone network (PSTN), global system for mobile communication (GSM) networks, time division multiple access (TDMA) networks, code division multiple access (CDMA) networks, such as interim standard 95 (IS-95) and subsequent iterations of CDMA technology, and integrated digital enhanced network (iDEN) networks, and the like. Examples of advanced communication networks include communication networks allowing for both voice or data transfer capabilities, such as a GSM or CDMA network overlaid with an Internet protocol (IP) multimedia subsystem (IMS) packet switched network (e.g., GSM/enhanced data rate for GSM evolution (EDGE) or CDMA evolution-data optimized (EV-DO) networks), or for simultaneous voice and data transfer capabilities such as packet switched Internet protocol (IP) networks including Voice over IP (VoIP) networks, IP Data networks, wireless fidelity (WiFi) networks, wireless interoperability for microwave access (WiMAX) networks, and similar networks. A traditional communication device can include, e.g., a circuit switched-only communication device including GSM, CDMA, iDEN, and TDMA communication devices, and PSTN telephones; an advanced communication device can include, for instance, a non circuit switched-only communication device, e.g., a circuit-switched/packet switched advanced second generation (2.5G) device such as a UMTS, CDMA EV-DO, GSM/EDGE or like communication device, or combination thereof, or a packet switched communication device such as a VoIP device or IP device, including a personal digital assistant (PDA), PC, a VoIP phone, universal mobile telecommunication system (UMTS) VoIP phone, a WiFi phone, a WiMAX phone, or like communication device, or a combination thereof. Conference call server 100 therefore has the capability to interconnect an incoming call whether utilizing traditional voice based communication networks or advanced voice and data communication networks, so long as the network has a public, commercial, or otherwise accessible private e.g., privately licensed, protocol. Furthermore, network bridge component 104 can open private communication channels between individual participants connected to conference call server 100, called side bar channels, while still maintaining and distributing a primary communication distributed across all connected networks and devices.

Figure 2:
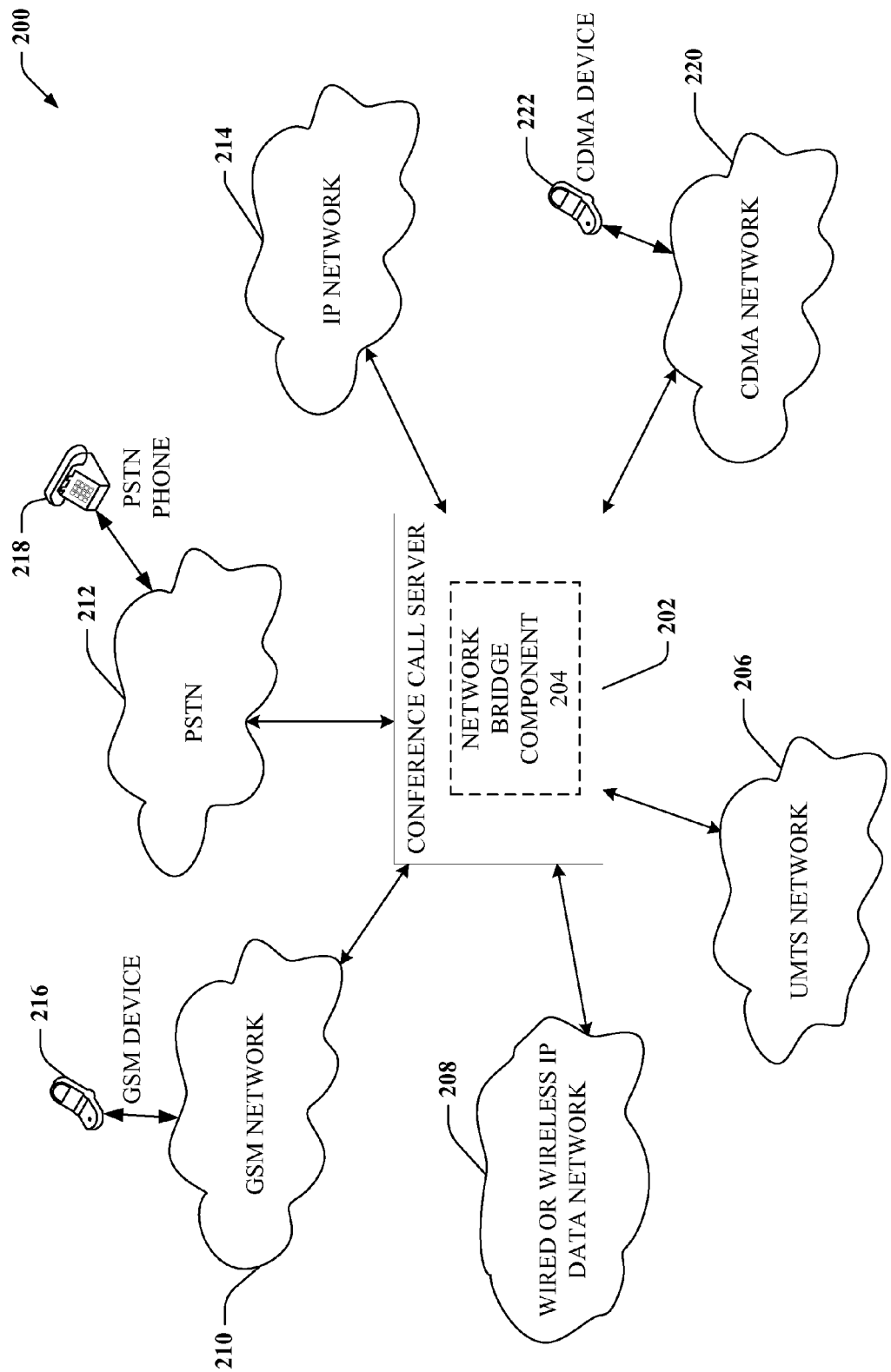
FIG. 2 is an example high-level methodology for interconnecting traditional and or advanced network voice telephone calls by way of a conference call communication bridge.

Referring now to FIG. 2, an example system 200 depicts a network bridge component 204 that can form a conference call between several traditional and advanced networks. In this example, conference call server 202 utilizes network bridge component 104 to interconnect, transcode and distribute data between a UMTS network 206, a wired or wireless IP data network 208, a GSM network 210, a PSTN network 212, an IP network 214, and a CDMA network 220. Each network (206, 208, 210, 212, 214, 220) utilizes various communication protocols to identify and route information, and to discover and correct errors in information, sent between devices connected on that network. Communication information distributed by these networks (206, 208, 210, 212, 214, 220) can take the form of a digital data packet, a signal sent by a switched electronic circuit, or another form that can be utilized to transmit information in a wired or wireless network. It is to be understood that, although specific networks are shown in FIG. 2, most any known networks (e.g., traditional and advanced) can be interconnected as illustrated without departing from the spirit and/or scope of this disclosure and claims appended hereto.

Network bridge component 204 can be pre-programmed or pre-installed with instructions for understanding the communication protocols used by traditional and advanced communication networks (206, 208, 210, 212, 214, 220), and further is pre-programmed or pre-installed with instructions for converting information sent by way of one communication protocol into other protocols required by other networks (206, 208, 210, 212, 214, 220). For instance, a GSM device 216 or CDMA device 222 connected by way of GSM network 210 or CDMA network 220 respectively, to conference call server 202 can send communication information utilizing a particular circuit-switched communication protocol (e.g., GSM or CDMA communication protocols). This means that information transmitted by such devices (216, 222) is identified, distinguished from information sent by other devices (e.g., PSTN phone 218), and routed to its proper destination by GSM or CDMA protocol requirements, and furthermore information is checked for errors and corrected by GSM or CDMA protocol requirements. Conventionally, a PSTN device 218 unfamiliar with such protocol requirements could be unable to identify, distinguish, route, check and correct information sent by a such protocols. Consequently, PSTN device 218 could not communicate with GSM device 216 or CDMA device 222 without a means to transcode GSM and/or CDMA protocol requirements into PSTN protocol requirements. Here, network bridge component 204 acts as a transcoding device. It is pre-programmed or pre-installed with instructions for converting information sent in a form required by one communication protocol into forms required by other communication protocols.

To further illustrate the previous GSM/CDMA and PSTN example, GSM device 216 and/or CDMA device 222 can send information to conference call server 202 by way of GSM network 210 or CDMA network 220 in accordance with respective GSM and CDMA protocol requirements. Network bridge component 204 can then convert such information sent in accordance with a particular network protocol requirement (e.g., CDMA, GSM, as used in the context provided by the instant example) into forms required by all other networks (206, 208, 212, 214, etc.) connected to conference call server 202. For instance, into forms required by IP network 214, UMTS network 206, wired or wireless IP data network 208, and PSTN network 212, and like communication networks. Therefore, conference call server 202 can interconnect communication devices regardless of what communication network (206, 208, 210, 212, 214) a device utilizes, and can provide a platform for simultaneous exchange of voice or voice and data communication between such communication devices.

Figure 3:
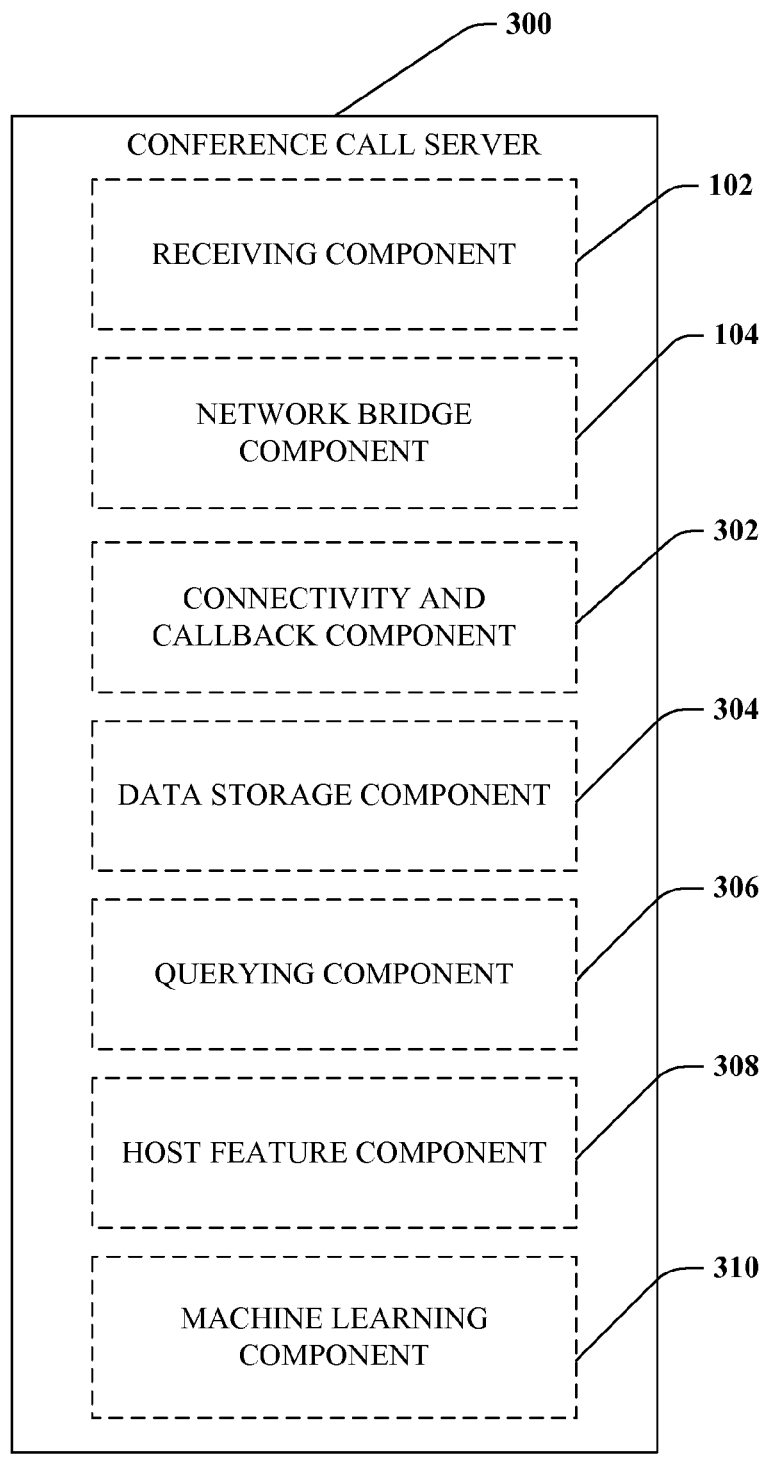
FIG. 3 is a high-level system diagram depicting a sample conference call server in accordance with an aspect of the subject disclosure.

Referring now to FIG. 3, an example embodiment of a conference call server 300 is depicted in accordance with aspects of the subject disclosure. As disclosed previously, receiving component 102 can receive communication calls incoming from various traditional and advanced communication network devices. Network bridge component 104 can interconnect communication calls received by receiving component 102 by creating a shared communication platform between all connected devices, whether traditional voice-only devices or advanced voice and data communication devices. Network bridge component 104 can further initiate and maintain private sidebar channels between two or more connected participants while maintaining and distributing a primary voice communication to all interconnected communication devices. Further functional components associated with conference call server 300 include, e.g., a connectivity and callback component 302, a data storage component 304, a querying component 306, a host feature component 308, and a machine-learning component 310.

Connectivity and call component 302 can determine whether a connected device becomes inadvertently disconnected from network bridge component 104, and can further initiate a callback routine to re-connect an inadvertently disconnected device. Connectivity and callback component can, for instance, request a query be sent by a querying component 306 to a network gateway device, or other device responsible for recording sources of call release events, over which a disconnected device was connected. Communication network gateway devices and other communication network components often have capabilities to determine whether a call was terminated or released by a caller, or call initiator, or a call recipient, or instead by way of an internal or external component of a communication network. If a communication network responds to querying component 306 indicating that a source of a call release was other than a caller or call recipient, then connectivity and callback component 302 can call back the disconnected device.

In another example, a communication device may send an end-of-call or call release message, such as by network call signaling and/or setup protocols including signaling system #7 (SS7) protocol, to a network to indicate the communication device is the source of a call termination event. Alternatively, a conference call host, as defined in the subject disclosure, may utilize a feature provided by host feature component 308 to disconnect a caller. If connectivity and callback component 302 can determine that a communication device or a conference call host is the source of a call release or call termination event, it can refrain from attempting to re-connect the disconnected device. In a further example in accord with the subject disclosure, if connectivity and callback component 302 can determine that a communication device is disconnected or released by a source other than a caller or a conference call host, connectivity and callback component 302 can initiate a callback routine to attempt to reconnect a caller.

Data storage component 304 can be any suitable physical or virtual memory capable of recording digital information. It can store information about prior connected communication devices for reference by machine learning component 310 e.g., voice and simultaneous voice and data capabilities of connected devices and prior application use histories of connected communication devices. Although the data storage component 304 is illustrated inclusive of conference call server 300, it is to be understood that all or a portion of the data storage component 304 can be remotely located. By way of example, data storage component 304 can be distributed throughout the network (e.g., local storage within networks 206, 208, 210, 212, 214, 220 of FIG. 2) without departing from the spirit and scope of the innovation described herein.

Querying component 306 can send requests for information from sources exterior to conference call server 300. For instance, querying component 306 can request capabilities of a connected communication device, including whether a device communicates through voice or simultaneous voice and data transmission. In addition it can request information from a network component including, e.g., location information of connected devices or call release information regarding a disconnected device. Querying component 306 can also execute other standard query routines utilized by communication networks and communication network devices as known in the art.

Host feature component 308 can provide additional conference call controls to a conference call host phone, in addition to controls provided to connected non-host devices described herein. For example, it can provide the capability to mute or un-mute a connected device, disconnect a connected device, initiate a conference call and corresponding communication bridge, and terminate a conference call and corresponding communication bridge. Additionally, a conference call host phone can display the status of each conference call participant connected to conference call server 300, can transfer host controls to another communication device connected to conference call server 300 without terminating a communication bridge, can block or modify a location identifier associated with a conference call participant, and can interact with and control conference call application data services.

A status of a conference call participant can include a location and names of each individual connected by way of a communication device, whether a participant is utilizing a voice or simultaneous voice and data communication device, whether a participant is utilizing any suitable application data services, and whether a participant is currently acting as conference call host. Conference call application data services can include, e.g., video sharing, document/file sharing, web site sharing, white-boarding, and chat sessions. In general, a conference call host phone is most often a communication device capable of simultaneous voice and data transmission and therefore can utilize all features provided by host feature component 308. Conference call host phones that are voice only communication devices are limited to a subset of features provided by host feature component 308.

Machine learning component 310 can automate processes associated with the subject innovation. For example, machine learning component 310 can store user profiles associated with a communication device on data storage component 304 indicating various applications that a device user desires to have automatically activated when a device connects to conference call server 300. A user profile may also store, for instance, user settings for applications provided by a conference call system, device wallpaper (e.g., display device background artwork, etc.) to be displayed on a communication device's display when connected to conference call server 300, and music to be played on a communication device when connected to conference call server 300. Machine learning component 310 can also automate other functions and applications of conference call server 300 and a conference application server known in the art; such other functions and applications are included in the subject disclosure.

Figure 4:
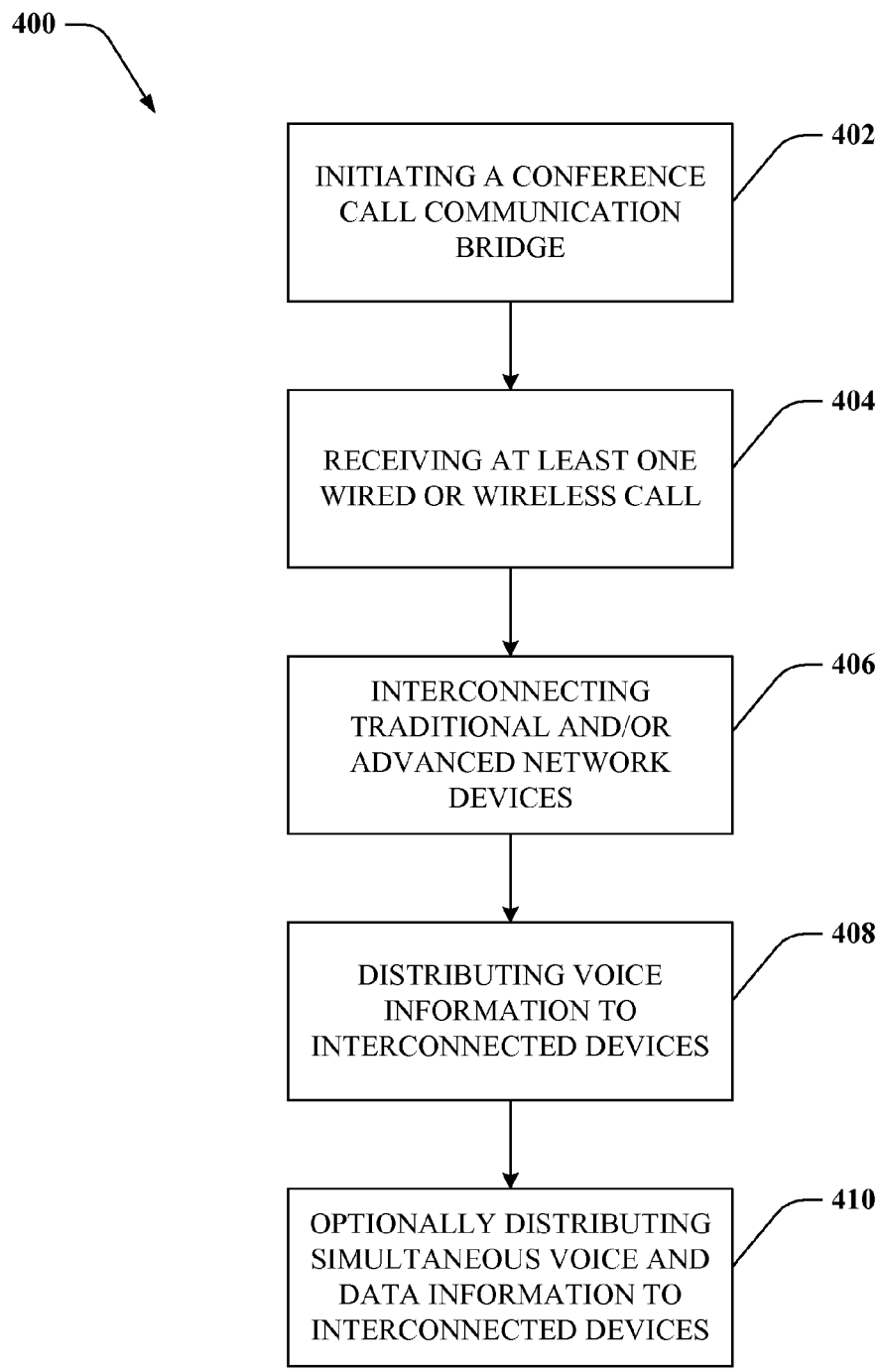
FIG. 4 is a high-level system diagram illustrating a sample conference call server utilizing a network bridge component in accordance with the disclosed innovation.

FIG. 4 depicts an example high-level methodology 400 for connecting traditional and advanced network communication devices by way of a single conference call server. The conference call server can interconnect devices that utilize voice communication protocols, alternate voice or data communication protocols, or simultaneous voice and data communication protocols. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For instance, those skilled in the art will understand and appreciate that a methodology could alternatively be represented as a series of interrelated states or events, such as in a state diagram. Moreover, not all illustrated acts may be required to implement a methodology in accordance with the innovation.

At 402, a conference call communication bridge can be initiated by a conference call host, for example. The conference call communication bridge is capable of transcoding information sent by way of one communication protocol into other communication protocols. Furthermore, the conference call communication bridge is capable of opening and maintaining sidebar communication channels as described in the subject disclosure. At 404, at least one wired or wireless call is received and connected to the conference call communication bridge. At 406, traditional and/or advanced network devices are interconnected across the conference call communication bridge. Traditional and/or advanced network devices can be interconnected when subsequent wired or wireless calls are received at the conference call communication bridge, for instance. At 408, voice information is distributed to all connected devices. At 410, simultaneous voice and data information is optionally distributed to devices capable of simultaneous voice and data communication.

Figure 5:
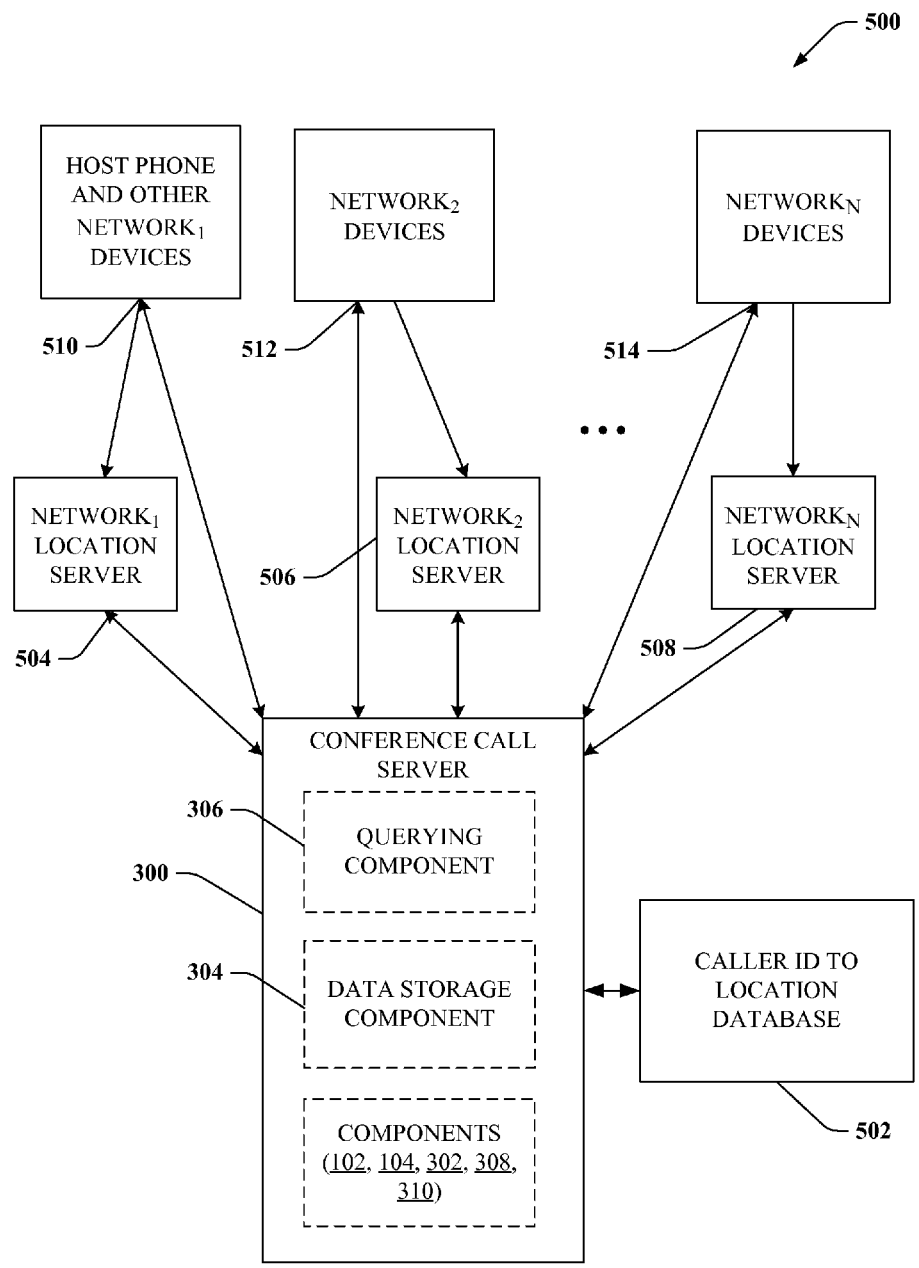
FIG. 5 is a depiction of an example system for determining and displaying a location for an incoming call to other conference call participants.

Referring now to FIG. 5, a system 500 is depicted that can determine location information associated with communication devices (510, 512, 514) connected to a conference call server 300. Location information can be used to populate a device information indicator of a conference call participant, indicating to other conference call participants a location where a participant's call is originating. Querying component 306 can request location information from a communication device, a location server associated with a device's communication network, a conference call host phone, a user-specified profile stored on conference call server 300 (e.g., within data storage component 304), or from a caller ID to location database 502.

For example, a host phone and other communication devices may be utilizing a first communication network, network$_1$. A network location server associated with network$_1$ is illustrated at 504 and communication devices, including a conference call host phone, utilizing network$_1$ are illustrated at 510. Querying component 306 can obtain a location of devices connected by way of network$_1$ by querying a location server 504 or by querying the devices (510) themselves. Similarly, querying component 306 can obtain location information from a network$_2$ location server 506 for all devices (512) connected on a second network. To abstract the illustration, querying component 306 can also obtain location information for all devices connected on an Nth network (where N is an integer) by querying a network$_N$ location server 508, or by querying the network$_N$ devices (514) themselves.

Finally, if neither a communication device nor a network location server responds to a location query or is capable of responding to a location query to identify a geographic location of an originating call, querying component 306 can query caller ID to location database 502 to obtain caller ID information about that communication device. For instance, caller ID to location database 502 can map Caller ID information for an incoming call to a location identified with the telephone number of the incoming communication device. A phone number of 425-580-xxxx could be mapped to Redmond, Wash. Conference call server 300 could then update a status indicator of a conference call participant with a caller ID location to indicate to other participants from where a call originates.

Figure 6:
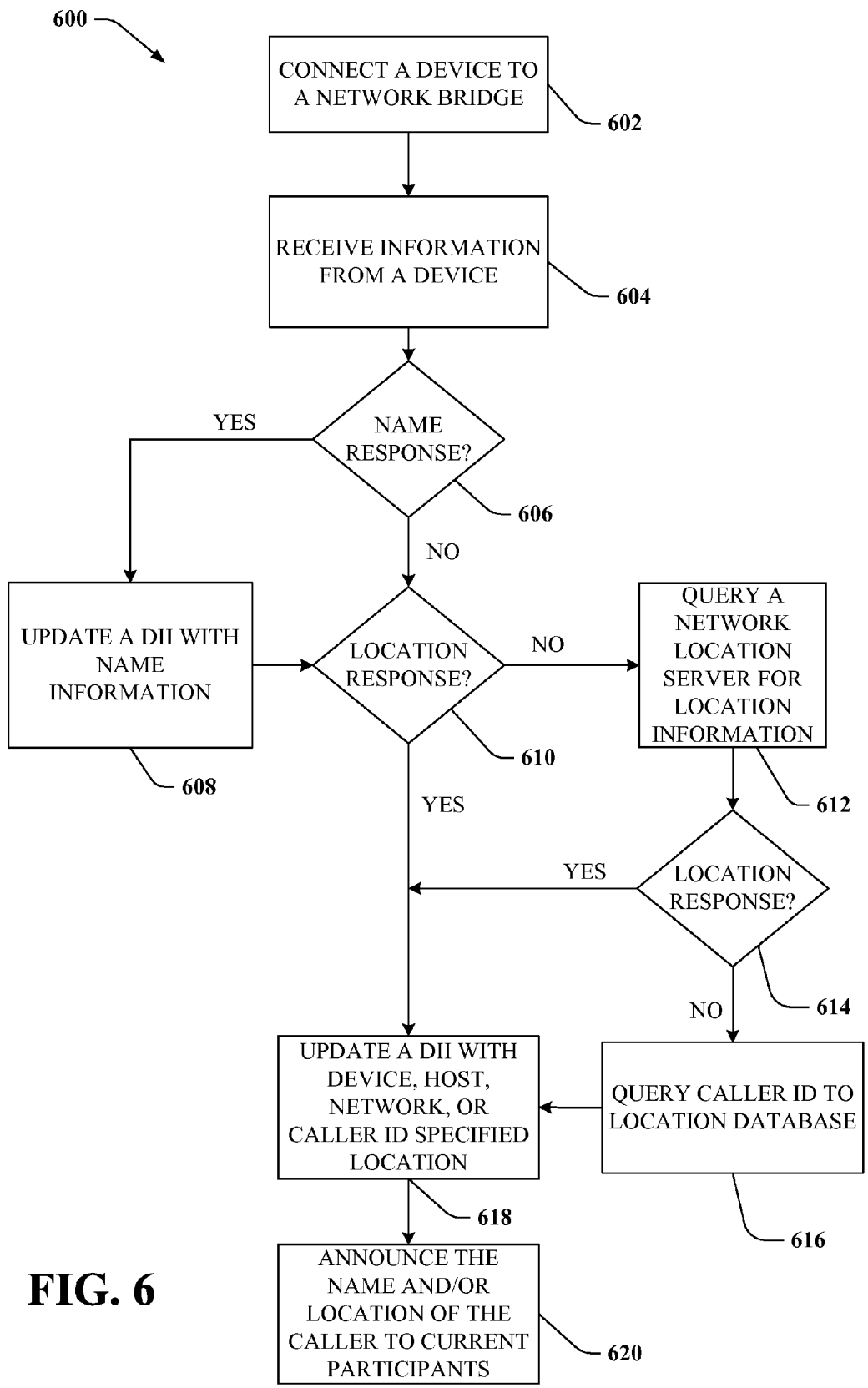
FIG. 6 illustrates an example methodology for determining and updating conference call participants with a name and location associated with an incoming voice call.

Referring now to FIG. 6, a methodology 600 is illustrated that further details an aspect of the subject disclosure. At 602, a communication device is connected to a network bridge as detailed in this disclosure. At 604, a conference call server receives information associated with such a device, which can include e.g. name and location information associated with a device, or other information identifying a device or its capabilities. More specifically, name and location information of a connected device can include, e.g., a location from which a communication device is calling, names of individuals participating in a conference call by way of a particular communication device etc.

A conference call server (e.g., 100) can attempt to acquire name and location information associated with a connected device, in order to populate a device information indicator (DII) associated with the device. A DII is a label associated with a connected device displayed to other conference call participants, that can include, for instance, a location from which a communication device is calling, names of individuals participating in a conference call by way of a particular communication device, user-specified information such as a name of an office or event with which others connected to the conference call are familiar with, and data services actively utilized by a communication device including streaming video, white boarding, text chat, sidebar channels, etc. A DII can also be populated with user-specified information, such as user-specified name and location information associated with a communication device or participants connected by way of a device. As an instance, if Bob Jones and Marie Antoinette are participating in a conference call by way of a VoIP communication device, device number 1, utilizing a VoIP network from an office in Massachusetts, a DII representing these callers can include all such information (e.g., participant name information, device location information, network architecture, device/network media capabilities, and the like). More specifically, the DII can specify that device number 1 is a VoIP phone from the Boston Mass. office, connecting Bob and Marie. It can also specify that device number 1 is utilizing one sidebar channel and a streaming video presentation simultaneously with a primary interconnected voice communication, and further has devices 2 and 3 muted. If Bob and/or Marie begin speaking over the primary interconnected voice communication channel, their DII could further indicate that it is an active speaking device and highlight the name of the individual speaking e.g., Bob, Marie or both.

Individuals using a connected communication device can specify particular identifying labels to be used as their DII, may elect not to have a DII associated with their device displayed during the conference call, or can allow a conference call server to list their DII with default information collected from other sources, e.g., a network location server. At 606, a determination is made as to whether information specifying names of individuals connected by way of a communication device was specified at 604. If so, methodology 600 proceeds to 608 and updates a DII associated with the responding communication device with name information included in the response. If no name information is specified at 604, methodology 600 proceeds from 606 to 610. At 610, the conference call server determines whether location information was specified at 604. If a communication device provided location information, methodology 600 proceeds to 618 and a DII associated with such device is updated (e.g., via a conference call server) to reflect the location information received at 604 and such DII can be displayed to all other conference call participants.

If no location information is received at 604, at 612 a network location server associated with a communication device is queried (e.g., by a conference call server) to obtain location information for such device. At 614, a determination is made as to whether a network location server provided location information for a device. If so, methodology 600 proceeds to 618 and updates a DII associated with a queried device with the network specified location information. If the network location server provides no response, or, for instance, a network location server cannot be found, methodology 600 proceeds to 616. At 616, the conference call server queries a caller ID to location database to obtain caller ID location information associated with a connected device.

Caller ID location information can associate a communication device with a region from which a call originates. More specifically, if caller ID information provides a caller ID number of 216-696-xxxx, then the caller ID to location database can associate a connected device with Cleveland, Ohio for instance. Subsequently, at 618, a DII representing a device can be updated with caller ID information (e.g., via a conference call server). If no information, whether user-specified, or provided by a network location server or caller ID to location database, then a DII can be updated with host-specified name and location information, or no information. At 620, names of participants and the location of the communication device as obtained by way of methodology 600 are announced to all current participants through the interconnected voice communication channel.

Figure 7:
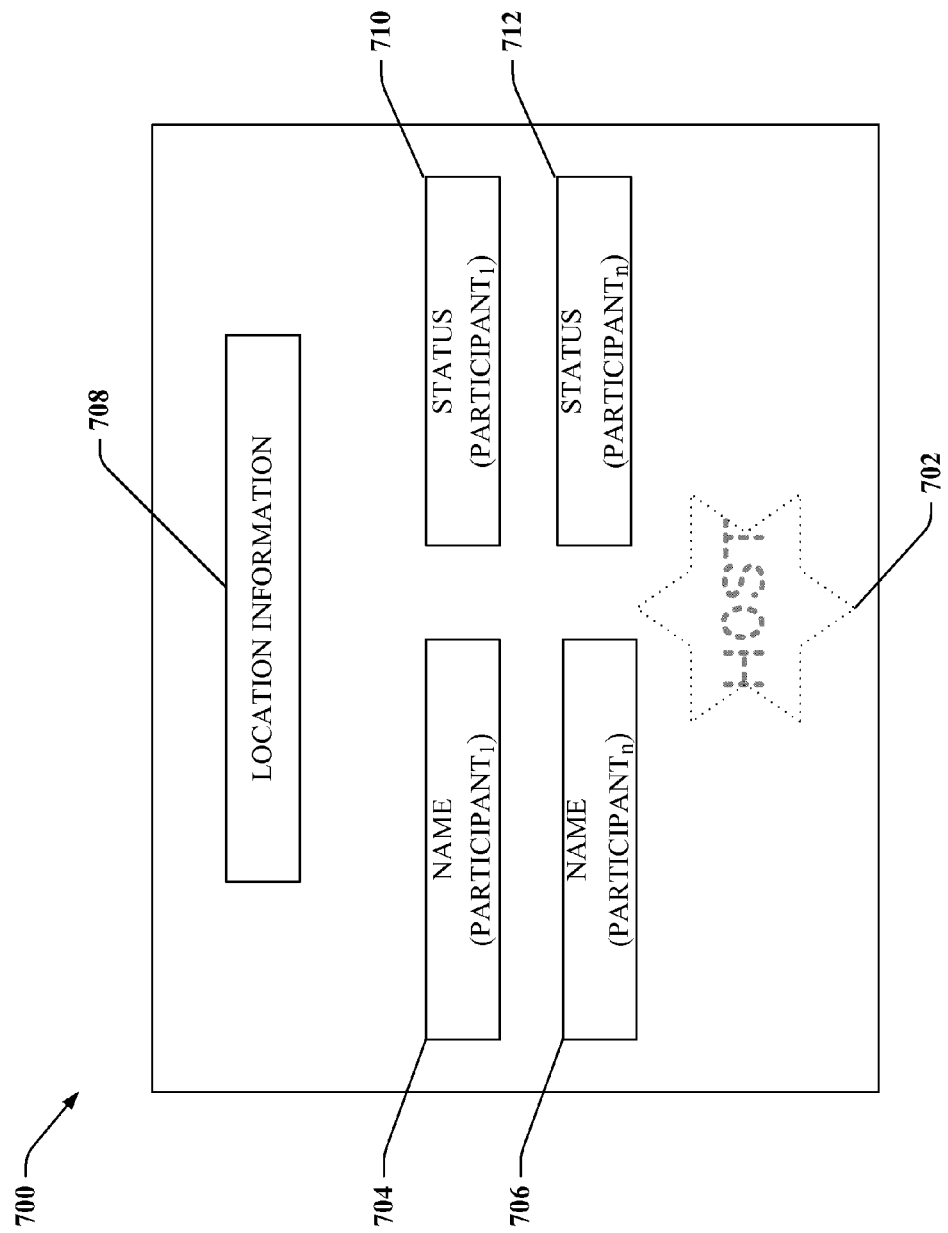
FIG. 7 depicts a sample User Interface label indicating the name, location and status of a connected conference call participant.

Referring now to FIG. 7, an example display of a DII associated with a single communication device is shown. A DII is an indicator that provides conference call participants information about one or more other participants currently connected to a conference call. A device information indicator can display names of individuals connected by way of, e.g., a device, a location of a calling device, and advanced application features currently being utilized by a device in conjunction with a conference call. Communication devices that are unable to display a DII due to inherent limitations in the device or the communication network utilized to connect to a conference call will display a DII in limited form or not at all.

DII 700 is an example of a DII associated with a connected device. It has user interface (UI) display fields that contain information about connected participants including, e.g., the names of connected participants, the location of a device, status of participants, and whether a device is currently acting as conference call host. Host indicator 702 can display whether a particular device is acting as the current conference call host. Name information fields 704 and 706 indicate the names of two participants connected by way of a particular communication device. These name fields can be populated by user-specified data, conference call host-specified data, or by data associated with a user profile generated by a machine-learning component (not shown). A location information field 708 displays information about the location of the connected device. Location information field 708 can be populated with information received by a communication device, by a network location server, caller ID to location database, or specified by a conference call host. Optionally, location information field 708 can be left blank if no information is received specifying location information of a communication device, or a user or conference call host specifies the field be blank.

Each individual connected to a conference call by way of a particular communication device can also have a status field associated with him or her, such as status fields 710 and 712. Status fields indicate the status of a participant, for example whether they are currently speaking over the interconnected voice communication channel, participating in a sidebar conversation, and/or using advanced application features. It should be appreciated that DII 700 is an example only. Many other user interface display configurations can be utilized to provide conference call participants information about other participants. Moreover, more information other than that displayed in FIG. 7 can be indicated by a DII, and it should be appreciated that the example depicted should not be construed to limit the subject disclosure to the embodiment depicted. Rather, embodiments known in the art or made known to one of skill in the art by way of the context provided by the example depicted in FIG. 7 are incorporated into the subject disclosure.

Figure 8:
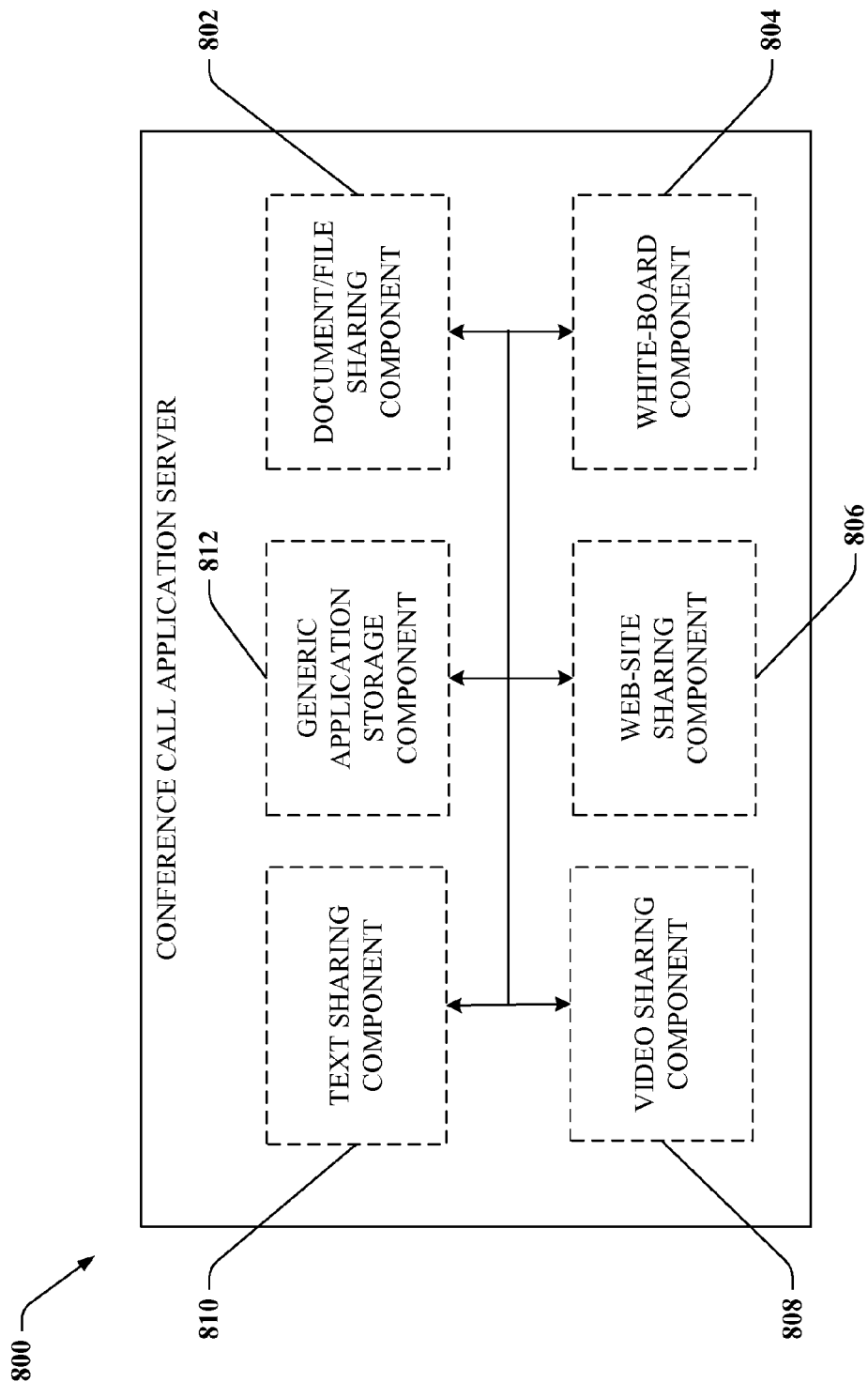
FIG. 8 shows a sample conference call application server in accordance with an aspect of the subject disclosure.

Referring now to FIG. 8, an example embodiment of a conference call application server 800 is depicted. Conference call application server 800 can be any suitable physical or virtual device capable of storing application programs, communicating and transferring data to other devices connected to it, and allowing connected devices to run applications stored thereon. Conference call application server 800, as depicted, contains several example application programs useful for conference calls. It should be noted that the conference call application server 800 is not limited to those application components component known to one of ordinary skill in the art.

Document sharing component 802 is an application that allows a conference call host to input and periodically update digital documents/files into a conference call server (e.g. conference call server 300 depicted in FIG. 3), and have those documents available for view by participants on the display screens of communication devices connected to a conference call server. A conference call server (e.g., 300) can simultaneously distribute shared documents with voice communication occurring over a primary interconnected voice communication channel. Digital documents can include, for instance, computer generated spreadsheet documents, word processing documents, presentation documents, graphics documents, digital pictures, photographs, drawings, and the like. Generally, only communication devices and networks capable of simultaneous voice and data transmission can receive a document/file sharing application while participating in a conference call.

White-board component 804 can be a component that stores and runs an application that continually inputs the contents of a writing board, such as a chalk board, a dry-erase board or similar, that a conference call host can write information on. Alternatively, the white-board component 804 can be an electronic version (e.g., digital and/or analog, or the like) of such writing board, chalk board, dry-erase board, etc., that is distributed and updated amongst displays of suitable devices participating in a conference call (e.g., via connection with conference call server 300). As a conference call host writes information onto the white board, all conference call participants utilizing the white board application will see the changes made onto the writing board, and can therefore read the information that a conference call host is writing. White board component 804 is useful for real-time or near real-time sharing of words, drawings or other depictions made by one participant with all other participants utilizing a white board application. A conference call server (e.g. 300) can simultaneously distribute white board communication with voice communication occurring over a primary interconnected voice communication channel. Generally, only communication devices and networks capable of simultaneous voice and data transmission can run a white board application while participating in a conference call.

Web-Site sharing component 806 is a component that stores and runs an application allowing some or all connected devices running the web-site sharing component to simultaneously view a particular web site. They may communicate and share information with each other by any suitable communication method commonly available across a website, such as e-mail, text chat, blog chat, and the like. A conference call server (e.g. 300 depicted at FIG. 3) can simultaneously transmit and/or update one or more web sites to a display associated with a connected communication device, thereby sharing a common website among conference call participants. Furthermore, such sharing can occur contemporaneous with voice communications distributed by a conference call server (e.g., 300). Generally, only communication devices and networks capable of simultaneous voice and data transmission can receive a web-site sharing application while participating in a conference call.

Video sharing component 808 is a component that stores and runs an application that allows participants to input real-time or near real-time video information into a conference call server (e.g. 300) and re-distribute it to some or all participants running a video sharing application. The conference call server (300) can simultaneously send shared video with voice communication occurring over a primary interconnected voice communication channel. Generally, only communication devices and networks capable of simultaneous voice and data transmission can run a video sharing application while participating in a conference call.

Text sharing component 810 is a component that stores and runs an application that allows participants to send and receive text information and simple graphic information (e.g., icons, emoticons, winks, nudges) amongst other participants while also participating in a conference call. Text sharing can be done for any suitable, connected device or for any specified set of conference call participants (e.g., private side-bar conversations). A conference call server (e.g. 300) simultaneously sends text information with voice communication occurring over a primary interconnected voice communication channel. Generally, only communication devices and networks capable of simultaneous voice and data transmission can run a text sharing application while participating in a conference call.

Generic application storage component 812 is a component or group of components that can store, communicate, and provide other applications associated with shared communication known to one of ordinary skill in the art. The examples listed in FIG. 8 should in no way limit the applications that can be associated with conference call application server 800. Although specific applications are depicted in FIG. 8, most any known application can be included into application storage component 812 without departing from the spirit and/or scope of this disclosure and claims appended hereto.

Figure 9:
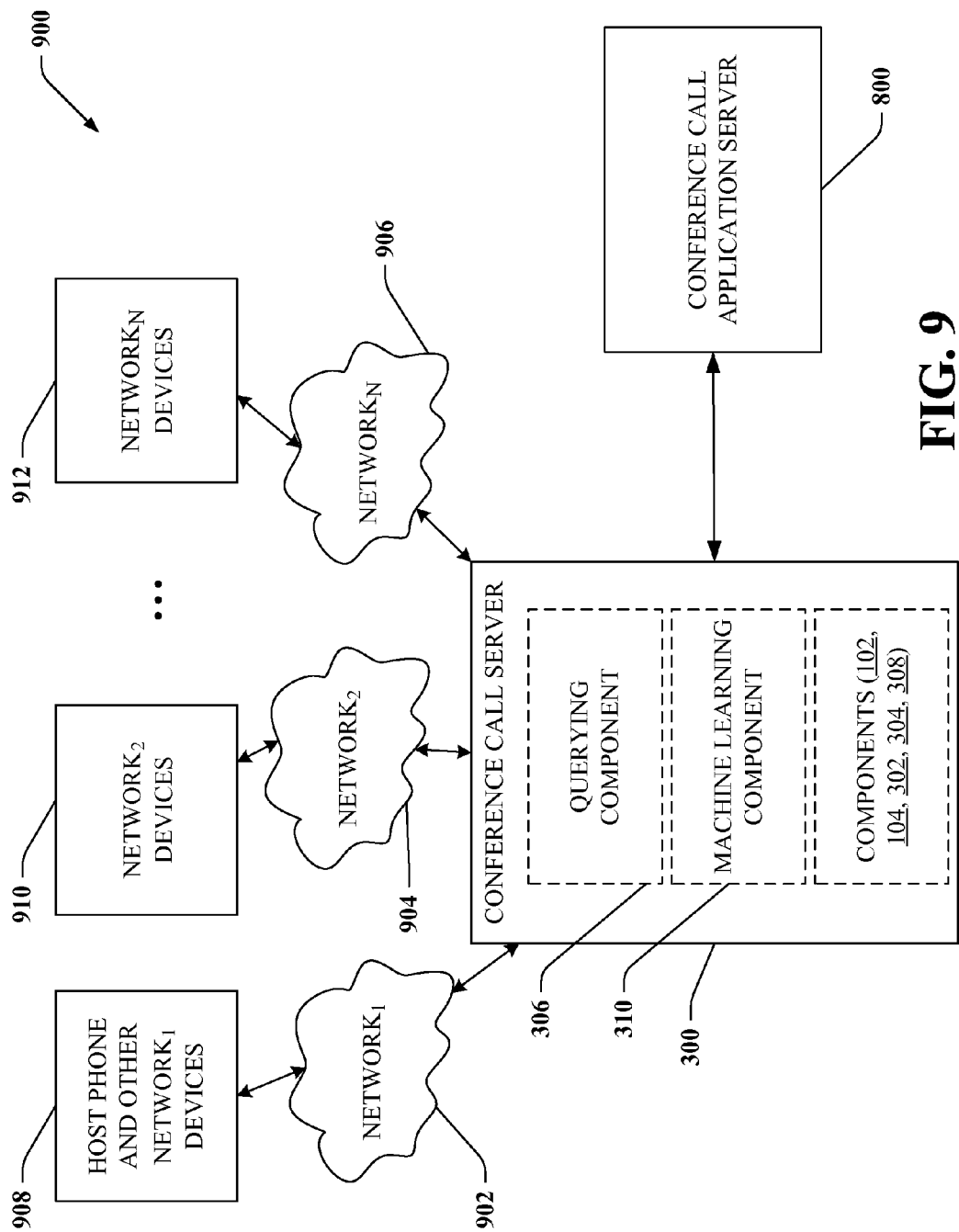
FIG. 9 illustrates an example system for determining the voice and data sharing capabilities of network devices connected to a conference call server.

Referring now to FIG. 9, a system 900 is depicted that can determine, store and remember application compatibility information associated with communication devices connected to a conference call server (e.g., conference call server 300). Such application compatibility information can be related to one or more conference call applications provided by conference call application server 800. Conference call server 300 can transmit a display indicator to a communication device indicating what application services are available to that particular communication device. Querying component 306 can request application compatibility information from a communication device, or a network server associated with a device's communication network. Alternatively, conference call application server 300 can attempt to run applications available to the conference call on a particular device to determine whether a device is capable of running an application, and then populate a display indicator with information indicating which available applications successfully ran on that device.

For instance, a host phone and other communication devices may be utilizing a first communication network, network$_1$ 902. Communication devices, including a conference call host phone, utilizing network$_1$ are illustrated at 908. Querying component 306 can obtain application compatibility information associated with devices connected by way of network$_1$ 902 by querying network$_1$ 902 or by querying the devices (908) themselves. Similarly, querying component 306 can obtain application compatibility information for all devices connected on a second network, network$_2$ devices 910, by querying those devices (910) or by querying network$_2$ 904. To abstract the illustration, querying component 306 can also obtain application compatibility information for all devices connected on an Nth network, network$_N$ devices 912, by querying those devices or by querying network$_N$ 906. Finally, if neither a communication device nor a network (or network server) responds to an application compatibility query or is capable of responding to an application compatibility query to identify applications compatible with a device, conference call server 300 could then transmit a display indicator to a connected device indicating that application compatibility could not be determined by conference call server 300.

Figure 10:
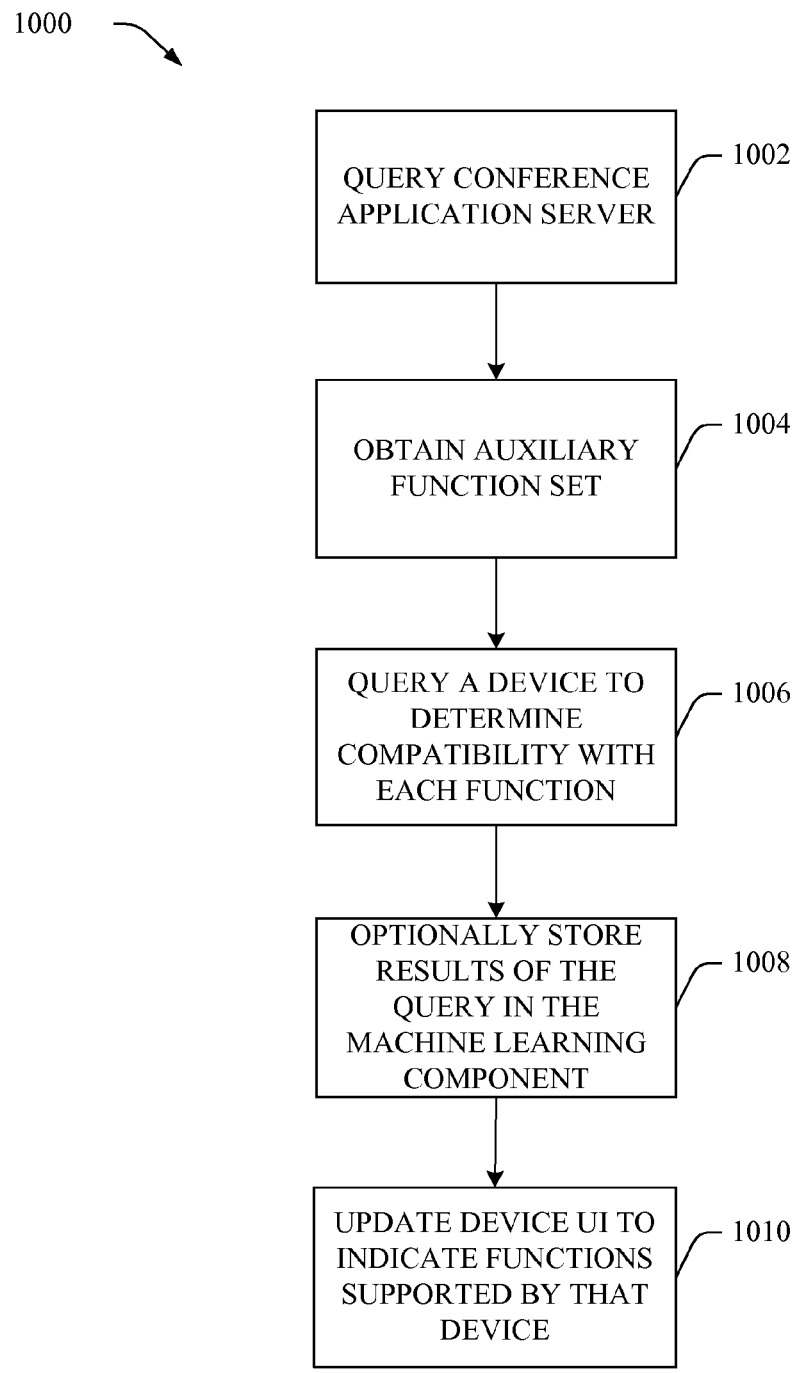
FIG. 10 depicts an example methodology wherein a conference call server updates a user interface of a connected device with available applications that are supported by the particular device.

FIG. 10 illustrates a methodology 1000 for determining compatibility with available applications in accordance with the subject innovation. At 1002, a query component queries a conference application server. The query can determine what auxiliary applications are available to a conference call. At 1004, conference application server responds with an auxiliary function set. An auxiliary function set can indicate all auxiliary applications that are stored on the conference application server and include a standard set of function calls that may be used to run an application on a device. A function call may be a command associated with an application programming interface (API), or similar mechanism known in the art for remote devices to call and activate applications stored on an application server.

At 1006, a connected communication device is queried to determine its compatibility with applications included within the auxiliary function set, and/or to determine whether a set of function calls may be transmitted to a communication device. At 1008 the results of the device query at 1006 are stored, e.g., on a data storage component, and made available to a machine-learning component. A machine-learning component can reference a stored query result if a device connects to a conference call server to identify whether compatibility with an application or set of applications has been previously determined. Such determination can be made by a prior query performed by a querying component and stored on a data storage component (e.g., 304 depicted at FIG. 3), or by a user-specified profile created by a user of a particular device and transmitted to a conference call server.

A machine-learning component can provide a user with an option to create a user-specified profile for their communication device, thereby establishing a desired set of applications for the machine-learning component to make available to a device for subsequent connections. Establishing and referencing a user-specified profile in the manner illustrated and similar methods known in the art for carrying out the same are included as a part of this methodology. At 1010, a conference call server transmits a display indicator for display on a user interface of a queried device that indicates which application functions are supported by and available to that device.

Figure 11:
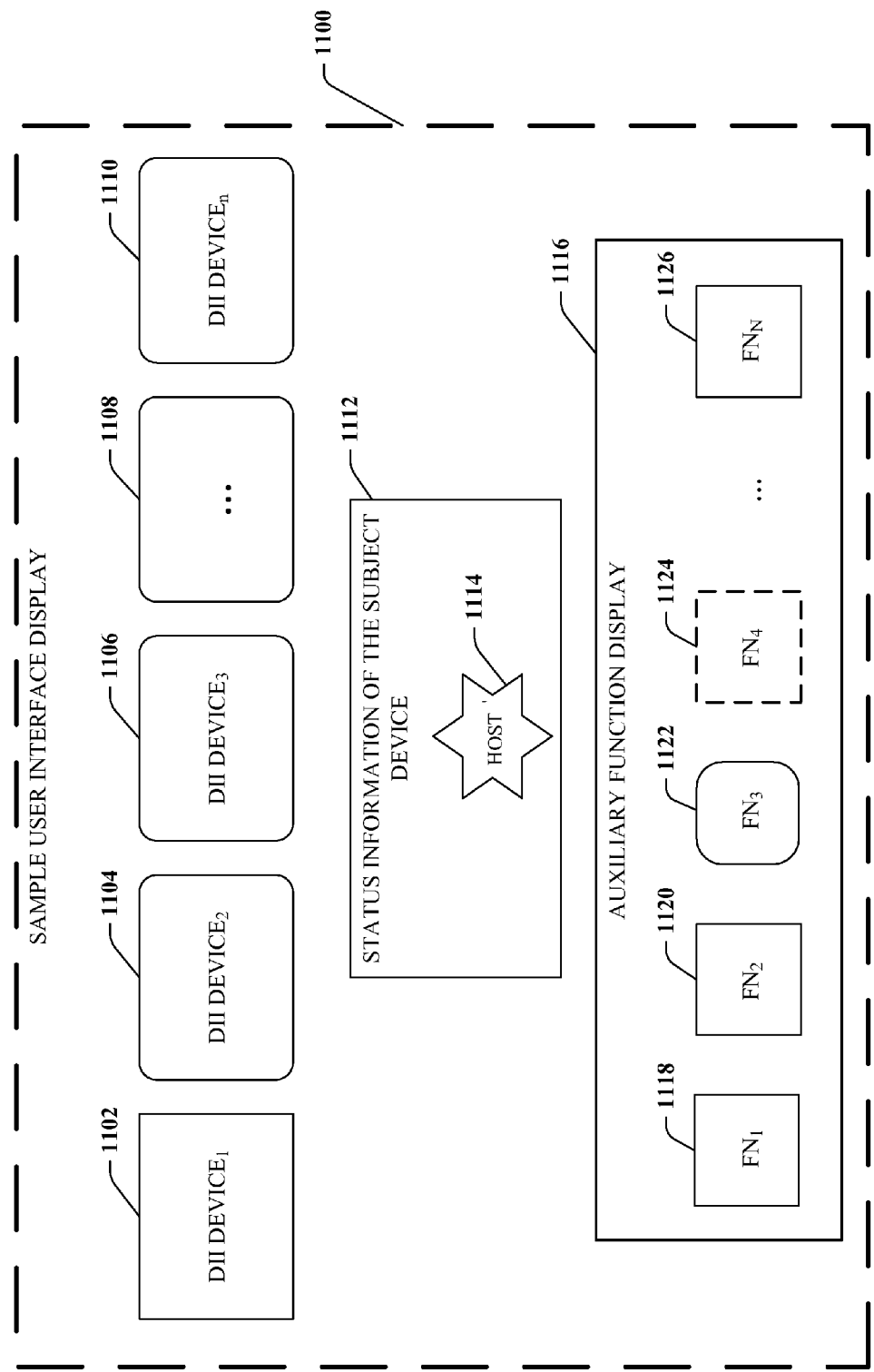
FIG. 11 illustrates a sample user interface for a conference call host device.

FIG. 11 is an example user interface display 1100 provided by a conference call server to a communication device capable of participating in simultaneous voice and data communication. Similar embodiments for displaying information about connected devices and about participants connected by way of devices are contemplated as part of this disclosure, including but not limited to, a status of connected devices and participants, applications being utilized by devices, the identity of a conference call host, and an identity of participants who are current speaking within the primary conference voice channel.

Each communication device capable of receiving and displaying user interface information from a conference call server can have a user interface display, e.g., user interface display 1100. A user interface display can contain a graphical reference to all devices connected to a conference call, such as DIIs 1102, 1104, 1106, 1108, and 1110. Each DII can further display information pertaining to participants utilizing a connected device, examples include names of individuals connected by way of a particular device, the location that a device is calling from, a status of a device and participants utilizing such device, (e.g., whether a participant is currently speaking, using a sidebar, using a conference call application, and/or acting as conference call host). A sample DII is illustrated at 700 in FIG. 7.

A DII associated with a device can appear graphically distinct from other DIIs if a participant of that device is one of the current speakers in the conference call. For instance, an indicator can be darkened, shaded, displayed as a raised and/or 3-dimensional block, displayed with square corners, etc., or combinations thereof. DII 1102, for instance, is depicted at FIG. 11 as graphically distinct from all other DIIs (1104, 1106, 1108 and 1110) to indicate that a participant connected by way of a device represented by DII 1102 is the current conference call speaker. If participants connected by way of a device represented by DII 1102 stop speaking on the conference call, DII 1102 can appear similar to other DIIs representing non-speaking participants, for example DIIs 1104, 1106, 1108 and 1110. A particular device can also display information indicating its own status, as depicted at 1112. It can indicate the names and status, as defined herein, of participants connected by way of that device (not shown), as well as indicate whether that device is a conference call host device, e.g., as depicted at 1114.

Auxiliary function display 1116 is a user interface display field that can indicate all available conference call application functions provided by a conference application server (e.g., as illustrated at 800 in FIG. 8). The conference call applications displayed to a particular connected device can be limited to applications that a device is compatible with (e.g., as determined by the methodology of FIG. 10), limited to applications indicated in a user-profile, or simply include all available applications. If applications that are unavailable to a device are not filtered by, for instance, a machine-learning component, they can be graphically distinct from those applications that are available. For example, $FN_3$ 1122 is displayed in a manner that is graphically distinct from other functions, 1118, 1120, 1124, and 1126, to indicate that it is a function that is not available. Furthermore, applications that are currently being utilized by a device can be graphically distinct from applications that are not currently being utilized by a device. For example, available function $FN_4$ 1124 is graphically distinct from non-available function $FN_3$, and is further graphically distinct from the other available functions that are not currently utilized, specifically functions $FN_1$ 1118, $FN_2$ 1120, and $FN_N$ 1126.

Figure 12:
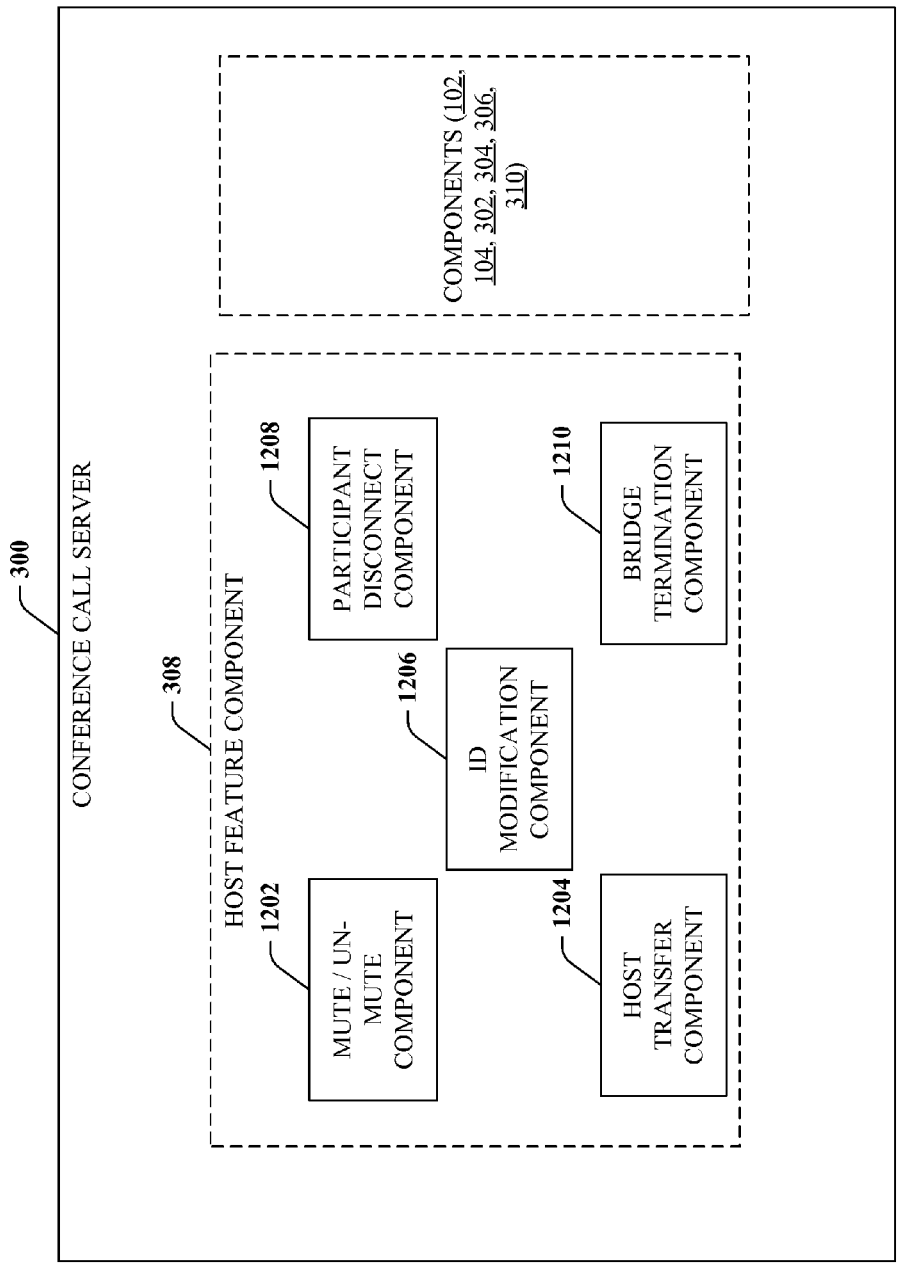
FIG. 12 is a sample system depicting capabilities of a host feature component of a conference call server in accordance with an aspect of this innovation.

Referring now to FIG. 12, an example of a detailed depiction of a host feature component 308 is indicated, including specific components that provide particular functions for a conference call host device. Mute/Unmute component 1202 enables a conference call host device to prevent audio data, incoming to a conference call server from a particular device, to be distributed to one or more other connected devices. From the perspective of other devices then, a muted device is completely silent. Mute/Unmute component 1202 further enables a conference call host device to unmute, or once again distribute audio data from a formerly muted device to other connected devices. Host transfer component 1204 enables a conference call host device to transfer conference call responsibilities and capabilities to another connected device that is capable of maintaining and/or moderating a network communication bridge as disclosed herein. In this manner, a conference call host can disconnect from a conference call without inadvertently terminating a network bridge. In addition, if a current conference call host is unintentionally disconnected from the network communication bridge, host transfer component 1204 will automatically transfer conference call host functions to another connected device capable of maintaining and/or moderating a network communication bridge.

ID modification component 1206 enables a conference call host to modify name or location information associated with a conference call device or participant. ID modification component 1206 could then update all device information indicators (e.g., as depicted in FIG. 7 and/or FIG. 11) transmitted to conference call participants with this modified information. More specifically, ID modification component 1206 could, for instance, allow a conference call host to provide different location information than what would be obtained from a network location server associated with a connected device, or caller ID information. If a conference call participant is working away from an office, for example, but wishes their location information to specify the office instead, ID modification component 1206 can set most any location information associated with that participant to display a name of an office. Participant disconnect component 1208 can enable a conference call host device to disconnect a participant currently connected to a conference call and network communication bridge. Bridge termination component 1210 enables a conference call host to terminate a network communication bridge, thereby terminating the conference call.

Figure 13:
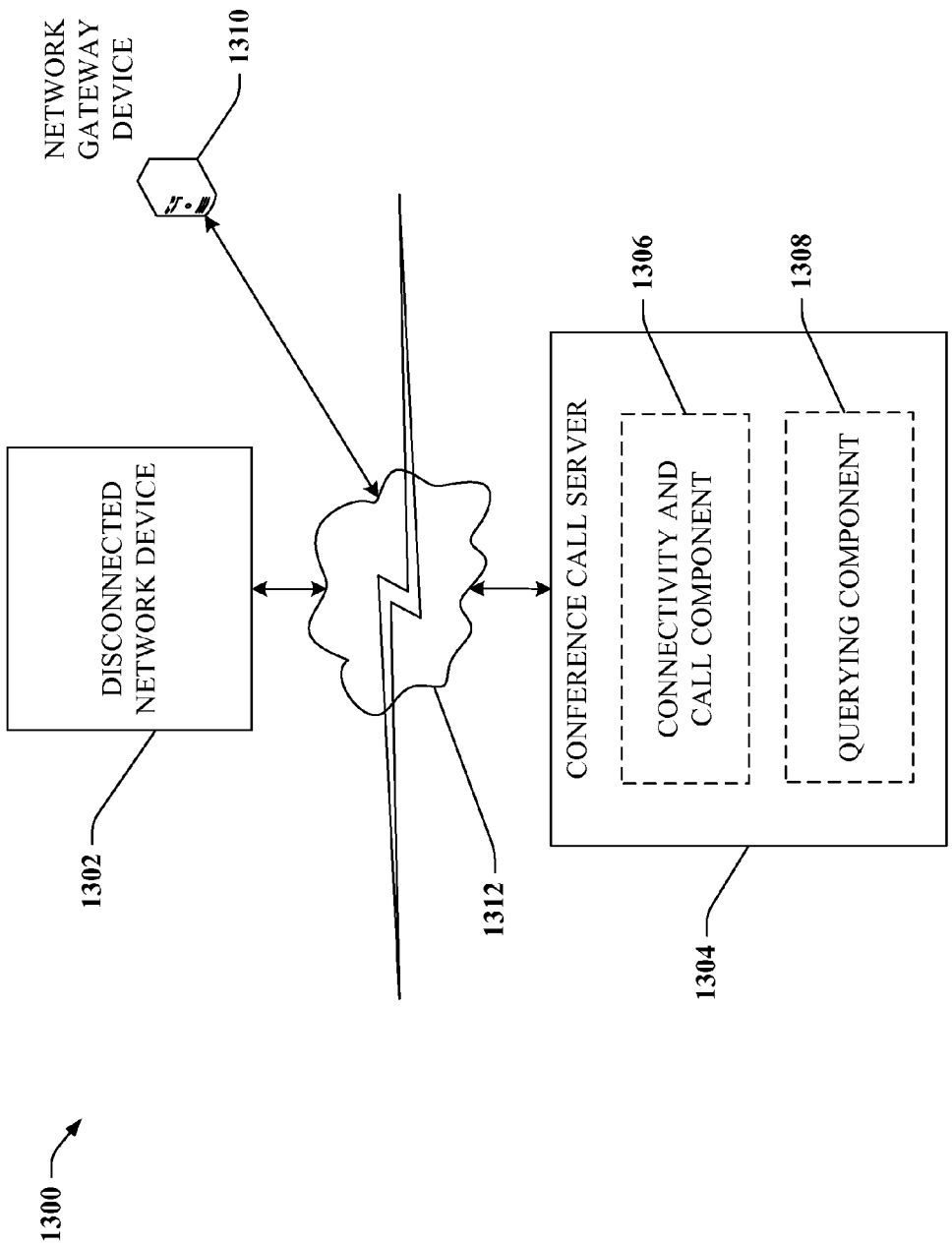
FIG. 13 depicts an example connectivity and callback component interacting with a disconnected device.

Referring now to FIG. 13, a system 1300 is depicted that can detect whether communication device 1302 has been inadvertently disconnected from a network communication bridge. In addition, system 1300 can re-connect such an inadvertently disconnected device. Conference call server 1304 can interconnect conventional and advanced communication devices as described in the subject disclosure supra. Connectivity and call component 1306 can determine whether a disconnected network device 1302 is inadvertently disconnected from a network bridge component (e.g., 104 depicted at FIG. 1), and can further initiate a callback routine attempting to re-connect an inadvertently disconnected device (1302). Connectivity and callback component 1306 can request a query be sent by a querying component 1308 to a network device responsible for recording sources of call release events including, e.g. a network gateway device 1310. Network gateway devices (e.g., 1310) associated with communication networks, and like network components, can typically determine whether a call was terminated or released by a caller, or call initiator, or a call recipient, or instead by way of an internal or external component of a communication network. If network gateway device 1310 responds to querying component 1308 indicating that a source of a call release was other than a caller or call recipient, then connectivity and callback component 1306 can initiate a call to the disconnected device to attempt to re-connect it to a network communication bridge.

As an example to provide context for aspects of the subject disclosure, if a connected device disconnects from a network communication bridge, connectivity and callback component 1306 can first query conference call server 1304 to determine whether a conference call host disconnected such device (e.g., by way of participant disconnect component 1226). Connectivity and callback component 1306 can then automatically query communication network 1312 through which a disconnected device (1302) had been connected to obtain call release information pertaining to the device (1302). Connectivity and callback component 1306 can then reference conference call server 1304 to determine whether default callback instructions have been established. Examples of such default instructions can include, but are not limited to: automatically re-connect a disconnected device, automatically re-connect a device that was not disconnected by the call initiator or by the conference call host, automatically re-connect a device not disconnected by the conference call host, and automatically re-connect a device not disconnected by the call initiator. Default callback parameters can be stored on conference call server 1304 (e.g., at connectivity and callback component 1306, or a data storage component such as that depicted at 304, etc.)

Alternatively, a default callback action can be specified by a user of a communication device, stored, for instance, as part of a user profile on a data storage component (e.g., 320 at FIG. 3). Connectivity and callback component 1306 can optionally reference a user profile to determine whether or not to re-connect a disconnected device. If no default callback instructions are established for callback routines, or a user profile is in conflict with a default callback instruction, connectivity and callback component 1306 can, for example, query a conference call host, indicate parameter conflicts, and request the conference call host to determine whether a device should be re-connected or not.

Figure 14:
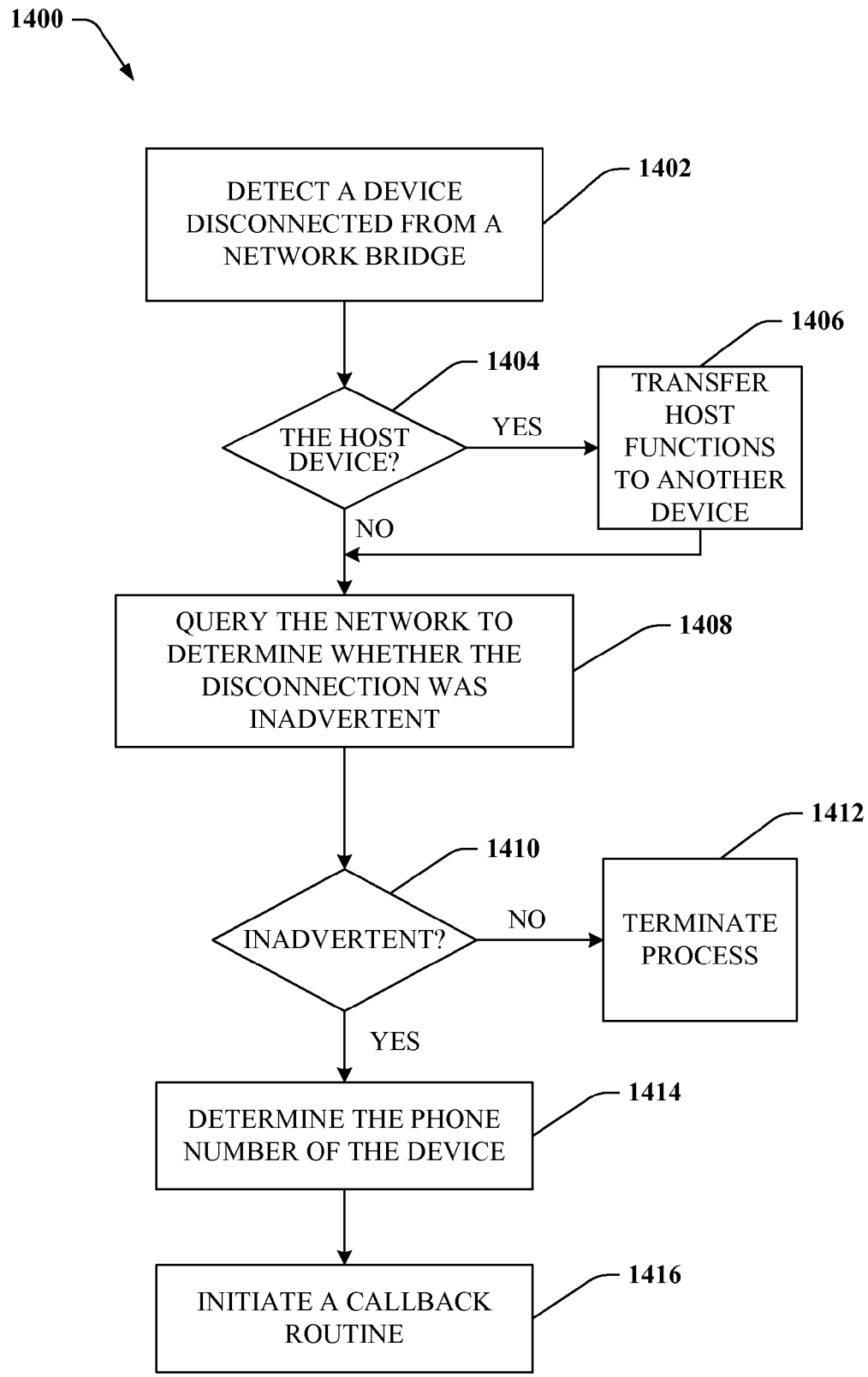
FIG. 14 depicts a sample methodology for automatically re-connecting an inadvertently disconnected device in accordance with an aspect of the subject specification.

FIG. 14 illustrates a methodology 1400 that further clarifies aspects of the subject disclosure. At 1402, a device is detected as being disconnected from a network bridge. Detection can be made by a connectivity and callback component or similar device, and/or algorithm, etc. At 1404, a determination is made as to whether a disconnected device is a conference call host phone. If so, methodology 1400 proceeds to 1406 and conference call host functions are automatically transferred to another connected device. Such a device can be determined to be capable of maintaining and/or moderating a network communication bridge to ensure that a conference call does not terminate prematurely. Next, at 1408, a network component is queried to determine whether the disconnection was inadvertent. Querying in such context can be performed by a connectivity and callback component. Alternatively or in addition, a connectivity and callback component can first query a conference call server to determine whether a conference call host disconnected a device.

At 1410, a determination is made as to whether the disconnection was inadvertent. This determination can be established, for instance, by way of disconnection instructions stored on a conference call server by a conference call host or other default means. If, at 1410, the connectivity and callback component determines that a device was intentionally disconnected, e.g., by a conference call host, a call initiator, or by way of some other default disconnection instruction, methodology 1400 proceeds to 1412 and the method terminates. If the connectivity and callback component determines that the device was disconnected unintentionally, and no disconnection instruction or user profile specifies otherwise, methodology 1400 proceeds to 1414 and a phone number for a disconnected device is obtained (e.g. by referencing a conference call server) and at 1416 a callback routine is initiated.

Figure 15:
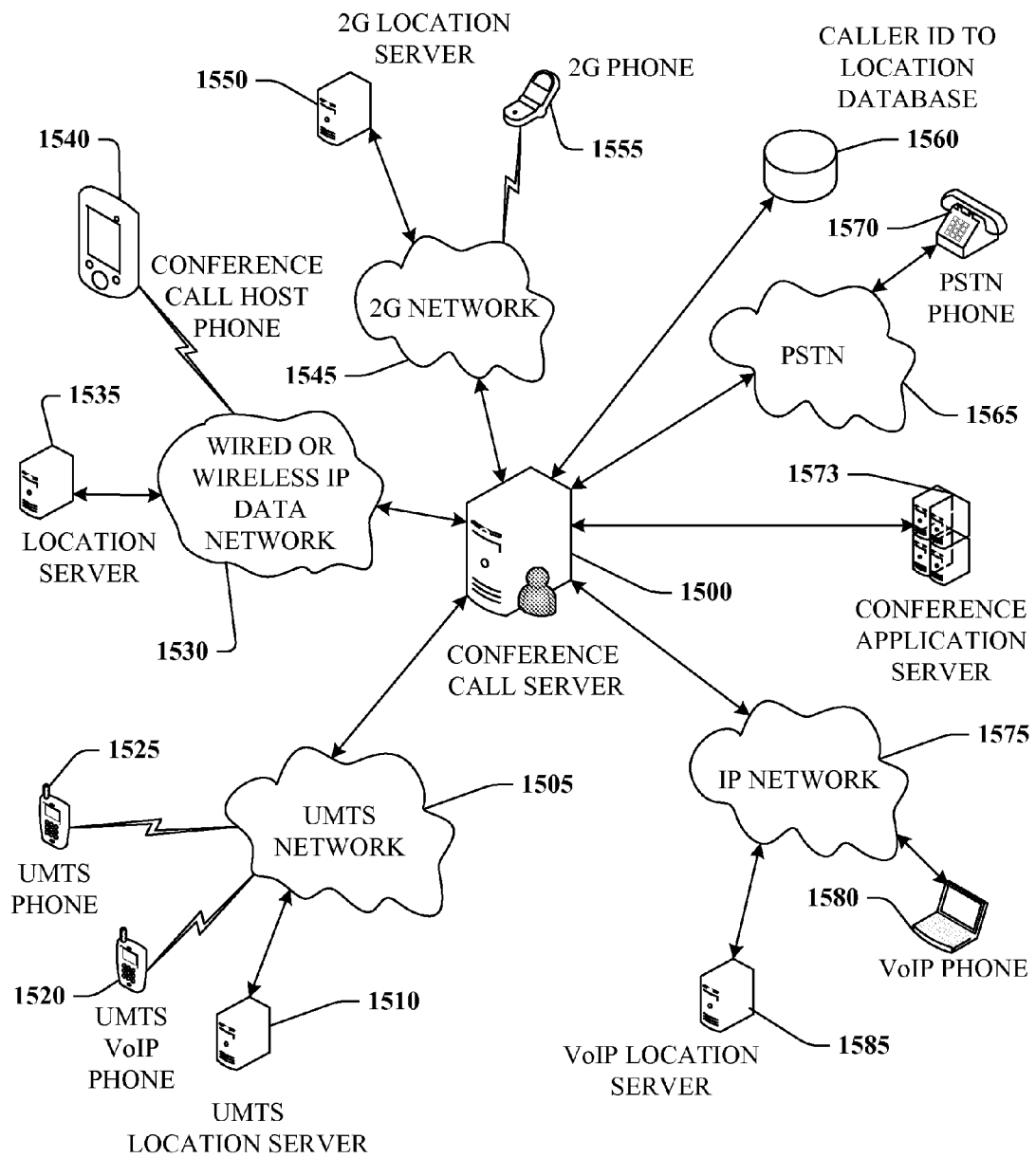
FIG. 15 is a sample conference call illustrating various traditional and advanced voice communication network devices interconnected by way of a single conference call server.

FIG. 15 is an example illustration of a conference call between various traditional and advanced network devices connected by way of various traditional and advanced communication networks to a conference call server. Conference call server 1500 is a server capable of interconnecting advanced and traditional communication network devices as defined herein. It supports all capabilities of traditional conference call servers, examples include interconnecting circuit switched voice communication network devices, distribution of all interconnected communications to all conference call participants, and support of dual-tone multi-frequency (DTMF) based commands such as Mute and Unmute.

Conference call server 1500 can further support additional capabilities over and above that of a traditional conference call server. For instance, conference call server 1500 can include support of multiple communication methods including VoIP and circuit switched communication, and support of transcoding information for distributing communication amongst various network architectures, communication devices, and telephones. Conference call server 1500 can identify each participant as their communication device connects to a conference call, and display the name, location and status of each participant to all other participants, and can graphically indicate or vocally announce the identity of each current speaker. One example of identification information for traditional communication devices, including second generation mobile (2G) devices (e.g., GSM, CDMA, iDEN, TDMA, and like devices), PSTN devices, and UMTS devices could be Caller ID information. One example of identification information for advanced voice and data communication devices, including VoIP devices, UMTS VoIP devices and conference call host phones, could be session initiation protocol (SIP) specifying, e.g., caller name, caller phone number and/or caller e-mail address, etc.

Conference call server 1500 can respond to conference call commands from advanced or traditional devices to facilitate a flexible conference call environment. More specifically, conference call server 1500 can further respond to conference call commands from advanced voice and data network communication devices including commands to mute and unmute a device, modify name or device information representing a device, block or modify location information representing a device and create a user-specified and/or machine-learning component-generated user profile associated with a device. Conference call server 1500 can also receive and respond to conference call host commands from a conference call host phone. Examples include capabilities to mute and unmute a connected device, disconnect a connected device, modify name, status or location information representing a connected device, for instance a conference call host phone can change caller ID information representing a device to a phone number of the device and name of a participant, block or modify location information associated with a device, initiate a communication bridge and conference call, terminate a communication bridge and conference call, and to transfer conference call host functions and responsibilities to another connected, capable, device, and create a user-specified and/or machine-learning component-generated user profile associated with a device functioning as conference call host phone.

In addition to capabilities stated above, conference call server 1500 can provide real-time status information by way of an IP data network interface to IP network capable devices. Such information can include a dynamic list of names of all connected conference call participants that updates as participants connect and disconnect. Also, the status information can be utilized to announce and/or identify the source of a voice communication (e.g., a current speaker(s)) currently being distributed across the network communication bridge, to indicate who is currently speaking, for instance. Furthermore, real-time status information can, e.g., identify a current conference call host, which participants are muted, if any, which participants are utilizing a sidebar channel, and which participants are utilizing a conference call application service. Additionally, conference call server 1500 can interconnect all conference call devices to a conference application server that can further provide auxiliary voice and data conference services such as video sharing, document/file sharing, web site sharing, whiteboarding, and chat sessions to devices capable of supporting these applications.

As illustrated in FIG. 15, conference call server 1500 can connect communication devices across several disparate communication networks and communication network architectures, specifically, a UMTS network 1505, a wired or wireless IP data network 1530, a 2G network 1545 (e.g., GSM, CDMA, iDEN, TDMA, and like networks), a PSTN network 1565, and IP network 1575 (as well as like communication networks). UMTS network 1505 is the UMTS based wireless network. The IP multimedia subsystem (IMS) is a component of UMTS network 1505 and of other networks that provide packet switched data transmission (e.g., 2G networks such as GSM and CDMA and similar networks overlaid with a packet-switched IMS infrastructure). The IMS is a standardized Next Generation Networking (NGN) architecture that can provide multimedia services traditionally available exclusively with only a mobile or a fixed communication device, to either of these devices. It uses a VoIP implementation over the standard existing internet protocol. Existing communication devices, including both advanced packet-switched capable devices and traditional circuit-switched devices, are supported by the IMS architecture. IMS is an architecture intended to provide mobile as well as non-mobile communication devices with media services provided by the Internet as well as specific features provided by a particular communication network provider. It is one architecture that can be utilized by conference call server 1500 to provide the rich application services of a conference application server 1573, and also to provide real-time status information about participating individuals and connected devices, as defined above.

UMTS network 1505 connects with conference call server 1500 by way of a UMTS interface that can support, for instance, both circuit switched and packed based communication. UMTS network 1505 is further connected to a UMTS phone 1525. UMTS phone 1525 is a third generation or later wireless phone that can include simultaneous circuit switched and packet data communication capabilities. Voice communication routed to UMTS phone 1525 can be circuit switched, and data communication routed to UMTS phone 1525 can be by way of a wireless data packet network associated with UMTS network 1505. UMTS network 1505 is also connected to UMTS VoIP phone 1520. UMTS VoIP phone 1520 can be a third generation or later wireless phone that can utilize packet data communication and can support voice communication by way of, e.g., VoIP over UMTS network 1505. A wireless data packet network can provide data communication with UMTS VoIP phone 1520 and VoIP via such a network can provide voice communication. UMTS network 1505 is further connected to UMTS location server 1510. UMTS location server 1510 can provide location information for e.g., UMTS phone 1525 and UMTS VoIP phone 1520. UMTS location server 1510 can utilize location determination techniques used with, for instance, Location Based Services, E-911 emergency calls, or VoIP emergency calls. The interface between UMTS network 1505 and UMTS location server 1510 can, for instance, use protocols that support Location Based Services, E-911 Emergency Calls, and VoIP Emergency Calls.

Wired or wireless IP data network 1530 can be either IP network 1575 or UMTS network 1505. The IMS can be a component of this network. Wired or wireless IP data network 1530 can connect to conference call server 1500 by way of a packet-switched connection and is capable of providing both data and voice communication services using, for example, VoIP services. Wired or wireless IP data network 1530 is further connected to a conference call host phone 1540. Conference call host phone 1540 is a VoIP and data capable communication device that can use SIP protocols, for example. It can connect through Wired or wireless IP data network 1530 to conference call server 1500 by way of a wired or wireless connection and can be, e.g., a PDA, PC, or an UMTS mobile communication device. The interface between wired or wireless IP data network 1530 and conference call host phone 1540 can provide both data and voice communications using, for example, VoIP services. Wired or wireless IP data network 1530 can be further connected to a wired or wireless IP data network location server 1535. This location server can provide the current location of conference call host phone 1540. It can use location determination techniques utilized for VoIP emergency calls and location determination techniques utilized for Location Based Services and E-911 emergency calls. The connection between wired or wireless IP data network 1530 and wired or wireless IP data network location server 1535 could use, for example, protocols that support emergency calls by way of VoIP and location based services associated with IP addresses, as well as protocols for supporting Location Based Services, E-911 services, and VoIP emergency calls, depending on the connection between Wired or wireless IP data network 1530 and conference call host phone 1540.

2G network 1545 is a second generation wireless network that can include network technologies such as TDMA, CDMA, GSM, iDEN, and the like. It can further include a second generation network (e.g., TDMA, CDMA, iDEN, GSM, or the like) overlaid with an IMS infrastructure for packet-switched communication. Such networks can typically be termed an advanced second generation network or 2.5G network. Examples of such can include a GSM/Enhanced data rate for GSM evolution (EDGE) network, a CDMA evolution-data optimized (EV-DO) network, or a GSM/GPRS/IP multimedia network architecture (discussed in more detail at FIG. 17 infra). 2G network 1545 connects to conference call server 1500 typically by way of a circuit switched voice connection based on TDMA, CDMA, GSM, iDEN, or IS-95, or similar circuit-switched network connection technologies (advanced 2G versions can alternatively connect via the IMS infrastructure). 2G network 1545 is further connected to a 2G phone 1555, typically by way of a circuit switched connection (or, e.g., via the IMS infrastructure utilizing packet switched communication for advanced 2G versions). 2G phone 1555 can be a first, second, or advanced second generation (e.g., CDMA EV-DO, GSM/EDGE, or the like) wireless communication device that utilizes a circuit switched or, where suitable, a circuit or packet switched mobile connection. 2G network 1545 is further connect to a 2G location server 1550 (which can serve, e.g., any suitable 2G or advanced 2G network as described herein). 2G location server 1550 is associated with 2G phones, for example 2G phone 1555, and 2G network 1545. 2G location server 1550 can provide a current location of a conference call participant who is using 2G phone 1555. 2G location server 1550 can use location determination techniques that are used, for instance, in Location Based Services or E-911 emergency calls and an interface between 2G network 1545 and 2G location server 1550 could use, for instance, Location Based Service and E-911 Emergency Call protocols. The connection between 2G network 1545 and 2G location server 1550 could support GSM, TDMA, IS-95, CDMA and/or similar 2G or advanced 2G based location determination protocols.

PSTN network 1565 is the public switched transport network that supports calls by way of technologies such as the integrated services digital network (ISDN) user part (ISUP). PSTN network 1565 can connect to conference call server 1500 by way of ISDN and ISUP interface protocols and similar protocols. PSTN network 1565 is further connected to a PSTN phone 1570 that can be a type of phone that can connect to a PSTN network (e.g., PSTN network 1565). Generally, a dedicated location server is not associated with PSTN network 1565. Location information regarding PSTN phone 1570 can be provided by other sources including, e.g., caller ID to location database 1560, or specified by conference call host phone 1540.

IP network 1575 is an IP based communication network that could comprise, e.g., an intranet, the Internet or like IP based networks, or combinations thereof. This IP based network could utilize a transport capability that includes wired (e.g., DSL, cable, etc.) or wireless (e.g., RF such as 802.11x, 802.16x, etc., microwave, optical, bluetooth, or the like) transport capability. The IMS could be a component of this IP based network. IP network 1575 is connected to conference call server 1500 by an IP based interface and can incorporate SIP protocols, for instance. The IP based interface can be wired or wireless and can be a virtual private network (VPN), an intranet, the Internet, or similar network, or combinations thereof. IP network 1575 is further connected to VoIP phone 1580. VoIP phone 1580 can be, e.g., a desktop phone, laptop, PDA and similar communication device supporting VoIP communication. The interface between IP network 1575 and VoIP phone 1580 can incorporate SIP protocols, for example. Such interface can be a wired or wireless interface and comprise a VPN, an intranet, the Internet, or like network, or combinations thereof. IP network 1575 is also connected to VoIP location server 1585. VoIP location server 1585 is a server associated with IP network 1575 and can provide location information related to a device connected by way of IP network 1575. This location server can utilize, e.g., location determination techniques used for VoIP emergency calls. The interface between IP network 1575 and VoIP location server 1585 can use, e.g., protocols developed to support emergency calls by way of VoIP and location based services associated with IP addresses. It can comprise, for example, a wired or wireless connection including a VPN, an intranet, the Internet, or combinations thereof.

Aside from capabilities already described, conference call host phone 1540 can have further capabilities to display a real-time status of all participants. Real-time status can include, for instance, names of all participants, location of all connected devices, an identity of a current speaker(s), which participants are muted or unmuted, whether connected devices can support conference call application features and which particular features, application features being utilized by each device, and whether a participant is engaged in a sidebar. Furthermore, conference call host phone 1540 can, for example, modify or block identification or location information associated with a participant and/or device, mute or unmute a participant, disconnect a connected conference call device, initiate a network communication bridge and an associated conference call, terminate a network communication bridge and an associated conference call, transfer host control functions to another connected device that is capable of moderating and/or sustaining a network communication bridge and conference call host functions, moderate, create, and terminate sidebar channels, and interact with and control conference call application services such as video sharing, document/file sharing, web site sharing, white-boarding, and chat sessions.

Advanced communication devices that can utilize simultaneous voice and data communication (e.g., UMTS phone 1525, UMTS VoIP phone 1520, conference call host phone 1540, and VoIP phone 1580) can also have additional capabilities other than those already described. Examples include display of a real-time status of all participants including names of all participants, location of all connected devices, display and announce an identity of the current speaker(s), which participants are muted or unmuted, which application features other connected devices can support and which application features are currently used by each, and whether a participant is engaged in a sidebar. Furthermore, these phones can modify or block their name and location information displayed to other participants, mute or unmute their connection to conference call server 1500, assume conference call host responsibilities upon transfer from a current conference call host or a host transfer component associated with conference call server 1500, participate in sidebar channels, and interact with conference call application services including video sharing, document/file sharing, web site sharing, white-boarding, and chat sessions.

Traditional communication devices (e.g., PSTN phone 1570 and 2G phone 1555 that utilize circuit switched communication) can be limited in the use and display of some conference call features and applications. Such traditional devices can participate in the voice communication of the conference call server as well as sidebar communications, and can mute and unmute their own connections and block display of their name and location information displayed to other participants by way of DTMF tone functionalities.

Conference application server 1573 can be a suitable component that can provide auxiliary voice and data conference call services to conference call server 1500. Examples of auxiliary voice and data conference call services include video sharing, document/file sharing, web site sharing, white-boarding and chat sessions. Conference application server 1573 can connect to conference call server 1500 by way of, for instance, an IP based interface. Caller ID to location database server 1560 can map caller ID information of a communication device to a location. As a more specific example, a phone number of 425-580-xxxx could be mapped to Redmond, Wash. This information can be transmitted to conference call server 1500 when no other location information about that participant can be obtained, for instance, as specified by a participant, a conference host, a network location server or other method. Conference call server 1500 could then identify and/or announce this particular participant with location information obtained from caller ID to location database 1560 (e.g., as "caller from Redmond, Wash."). Finally, it should be understood that FIG. 15 represents only one possible example of a conference call connection and should not be construed to limit other possible connections.

Figure 16:
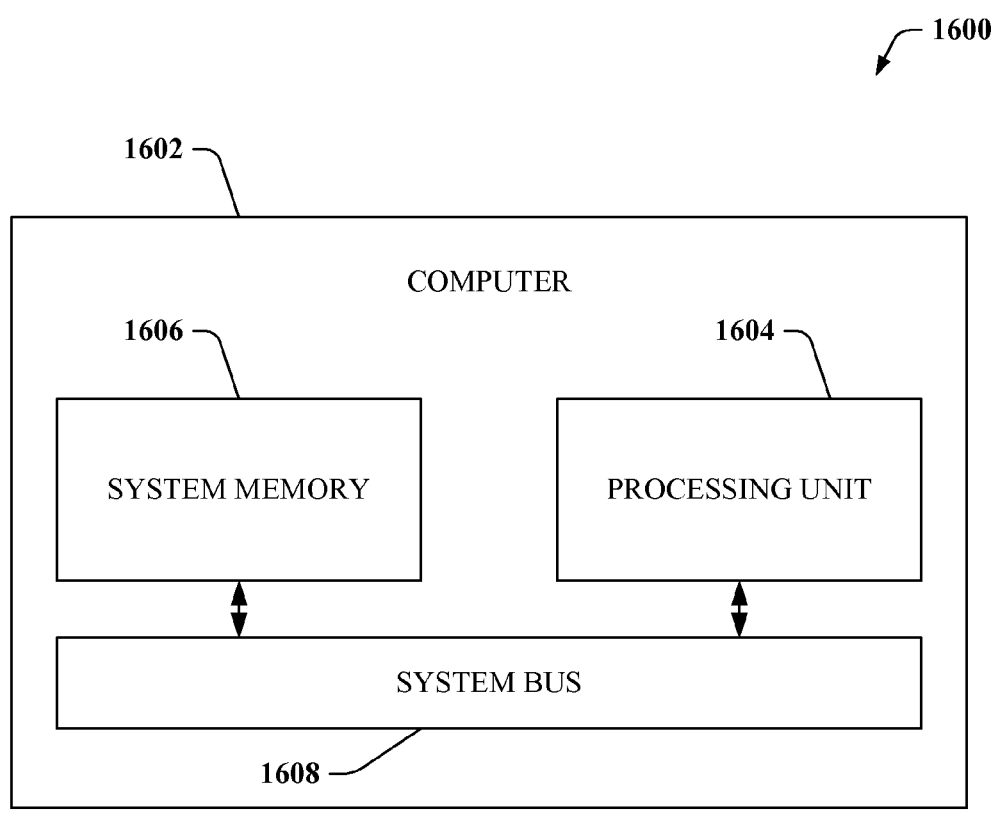
FIG. 16 illustrates an example computing environment that can be employed in connection with various aspects described herein.

Referring now to FIG. 16, there is illustrated a block diagram of a computer operable to provide networking and communication capabilities between a wired or wireless communication network and a server and/or communication device. While shown through use of a computer or computing components, it is understood that the claimed subject matter may be implemented as a method, apparatus, or article of manufacture using standard programming and/or engineering techniques to produce software, firmware, hardware, or any suitable combination thereof to control a computing device, such as a mobile handset, to implement the disclosed subject matter. The term "article of manufacture" as used herein is intended to encompass a computer program accessible from a computer-readable device, carrier, or media. For example, computer readable media can include but is not limited to magnetic storage devices (e.g., hard disk, floppy disk, magnetic strips . . . ), optical disks (e.g., compact disk (CD), digital versatile disk (DVD) . . . ), smart cards, SIM cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

In order to provide additional context for various aspects of the claimed subject matter, FIG. 16 and the following discussion are intended to provide a brief, general description of a suitable computing environment 1600 in which the various aspects described herein can be implemented. While the description above is in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any suitable available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in a method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or other medium which can be used to store the desired information and which can be accessed by the computer.

Communication media typically embodies computer-readable instructions, data structures, program modules or other data in a modulated data signal such as a carrier wave or other transport mechanism, and includes information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the above should also be included within the scope of computer-readable media.

With reference again to FIG. 16, the exemplary environment 1600 for implementing various aspects includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various suitable commercially available processors, such a single core processor, a multi-core processor, or any other suitable arrangement of processors.

The system bus 1608 can be most any of several types of bus structure that can further interconnect to a memory bus (with or without a memory controller), a peripheral bus, and a local bus using at least one of a variety of commercially available bus architectures. The system memory 1606 can include read-only memory (ROM), random access memory (RAM), high-speed RAM (such as static RAM), EPROM, EEPROM, and/or the like. Additionally or alternatively, the computer 1602 can include a hard disk drive, upon which program instructions, data, and the like can be retained. Moreover, removable data storage can be associated with the computer 1602. Hard disk drives, removable media, etc. can be communicatively coupled to the processing unit 1604 by way of the system bus 1608.

The system memory 1606 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 1602 through one or more wired/wireless input devices, such as a keyboard, pointing and clicking mechanism, pressure sensitive screen, microphone, joystick, stylus pen, etc. A monitor or other type of interface can also be connected to the system bus 1608.

The computer 1602 may operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 1602 can connect to other devices/networks by way of antenna, port, network interface adaptor, wireless access point, modem, and/or the like.

The computer 1602 is operable to communicate with any suitable wireless devices or entities operatively disposed in wireless communication, e.g., a printer, scanner, desktop and/or portable computer, portable data assistant, communications satellite, any suitable piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out, within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 17:
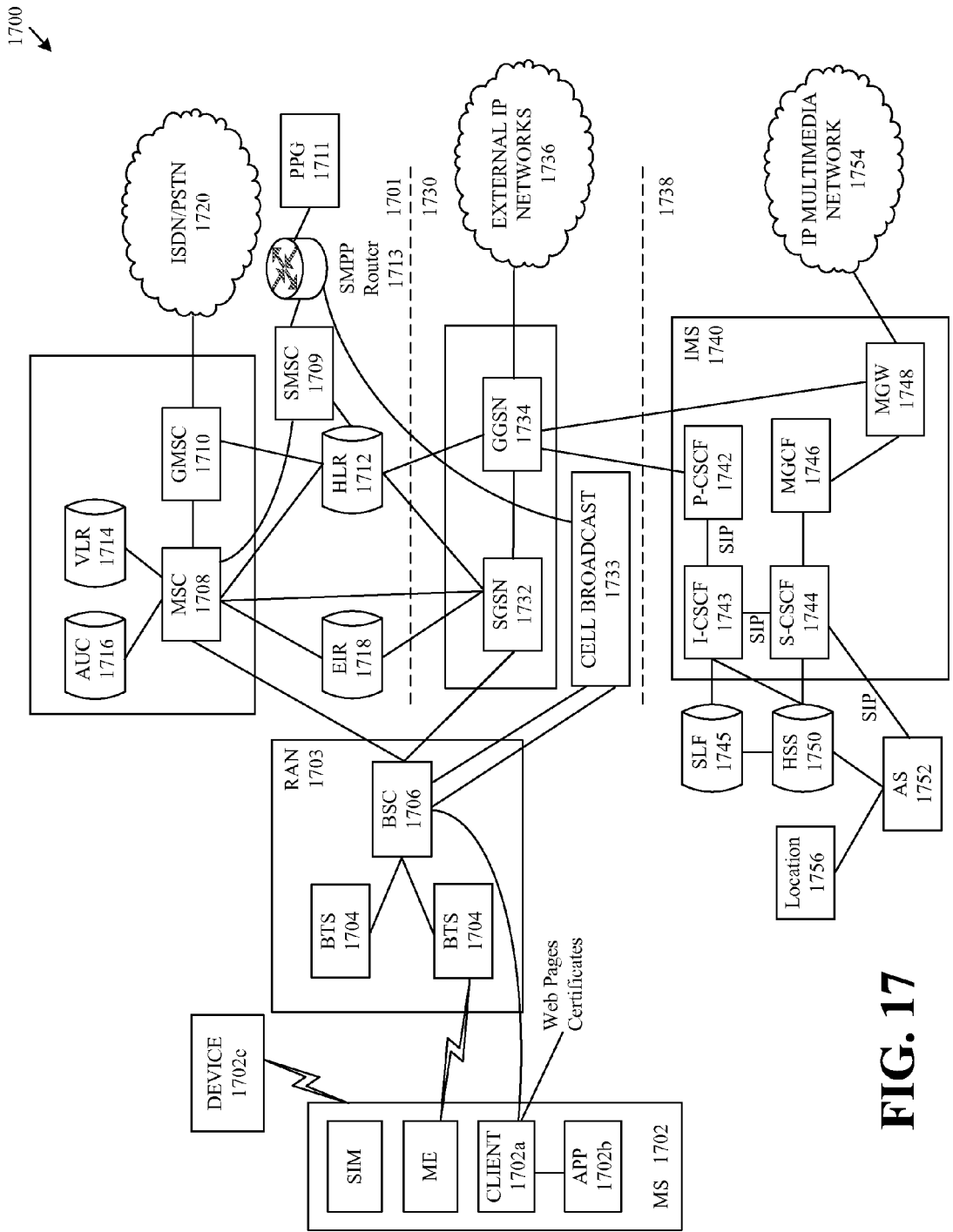
FIG. 17 is an example networking environment that can be employed in remote communication in accordance with aspects of the subject disclosure.

Now turning to FIG. 17, such figure depicts a GSM/GPRS/IP multimedia network architecture 1700 that includes a GSM core network 1701, a GPRS network 1730 and an IP multimedia network 1738. The GSM core network 1701 includes a Mobile Station (MS) 1702, at least one Base Transceiver Station (BTS) 1704 and a Base Station Controller (BSC) 1706. The MS 1702 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1702 includes an embedded client 1702a that receives and processes messages received by the MS 1702. The embedded client 1702a may be implemented in JAVA and is discuss more fully below.

The embedded client 1702a communicates with an application 1702b that provides services and/or information to an end user. One example of the application may be navigation software that provides near real-time traffic information that is received via the embedded client 1702a to the end user. The navigation software may provide road conditions, suggest alternate routes, etc. based on the location of the MS 1702. Those of ordinary skill in the art understand that there are many different methods and systems of locating an MS 1702.

Alternatively, the MS 1702 and a device 1702c may be enabled to communicate via a short-range wireless communication link, such as BLUETOOTH. For example, a BLUETOOTH SIM Access Profile may be provided in an automobile (e.g., device 1702c) that communicates with the SIM in the MS 1702 to enable the automobile's communications system to pull information from the MS 1702. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 1702c. There may be an endless number of devices 1702c that use the SIM within the MS 1702 to provide services, information, data, audio, video, etc. to end users.

The BTS 1704 is physical equipment, such as a radio tower, that enables a radio interface to communicate with the MS. Each BTS may serve more than one MS. The BSC 1706 manages radio resources, including the BTS. The BSC may be connected to several BTSs. The BSC and BTS components, in combination, are generally referred to as a base station (BSS) or radio access network (RAN) 1703.

The GSM core network 1701 also includes a Mobile Switching Center (MSC) 1708, a Gateway Mobile Switching Center (GMSC) 1710, a Home Location Register (HLR) 1712, Visitor Location Register (VLR) 1714, an Authentication Center (AuC) 1718, and an Equipment Identity Register (EIR) 1716. The MSC 1708 performs a switching function for the network. The MSC also performs other functions, such as registration, authentication, location updating, handovers, and call routing. The GMSC 1710 provides a gateway between the GSM network and other networks, such as an Integrated Services Digital Network (ISDN) or Public Switched Telephone Networks (PSTNs) 1720. In other words, the GMSC 1710 provides interworking functionality with external networks.

The HLR 1712 is a database or component(s) that comprises administrative information regarding each subscriber registered in a corresponding GSM network. The HLR 1712 also includes the current location of each MS. The VLR 1714 is a database or component(s) that contains selected administrative information from the HLR 1712. The VLR contains information necessary for call control and provision of subscribed services for each MS currently located in a geographical area controlled by the VLR. The HLR 1712 and the VLR 1714, together with the MSC 1708, provide the call routing and roaming capabilities of GSM. The AuC 1716 provides the parameters needed for authentication and encryption functions. Such parameters allow verification of a subscriber's identity. The EIR 1718 stores security-sensitive information about the mobile equipment.

A Short Message Service Center (SMSC) 1709 allows one-to-one Short Message Service (SMS) messages to be sent to/from the MS 1702. A Push Proxy Gateway (PPG) 1711 is used to "push" (e.g., send without a synchronous request) content to the MS 1702. The PPG 1711 acts as a proxy between wired and wireless networks to facilitate pushing of data to the MS 1702. A Short Message Peer to Peer (SMPP) protocol router 1713 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1702 sends a location update including its current location information to the MSC/VLR, via the BTS 1704 and the BSC 1706. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1730 is logically implemented on the GSM core network architecture by introducing two packet-switching network nodes, a serving GPRS support node (SGSN) 1732, a cell broadcast and a Gateway GPRS support node (GGSN) 1734. The SGSN 1732 is at the same hierarchical level as the MSC 1708 in the GSM network. The SGSN controls the connection between the GPRS network and the MS 1702. The SGSN also keeps track of individual MS's locations and security functions and access controls.

A Cell Broadcast Center (CBC) 1733 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1734 provides a gateway between the GPRS network and a public packet network (PDN) or other IP networks 1736. That is, the GGSN provides interworking functionality with external networks, and sets up a logical link to the MS through the SGSN. When packet-switched data leaves the GPRS network, it is transferred to an external TCP-IP network 1736, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1730 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while received data and vise versa.

The IP multimedia network 1738 was introduced with 3GPP Release 5, and includes an IP multimedia subsystem (IMS) 1740 to provide rich multimedia services to end users. A representative set of the network entities within the IMS 1740 are a call/session control function (CSCF), a media gateway control function (MGCF) 1746, a media gateway (MGW) 1748, and a master subscriber database, called a home subscriber server (HSS) 1750. The HSS 1750 may be common to the GSM network 1701, the GPRS network 1730 as well as the IP multimedia network 1738.

The IP multimedia system 1740 is built around the call/session control function, of which there are three types: an interrogating CSCF (I-CSCF) 1743, a proxy CSCF (P-CSCF) 1742, and a serving CSCF (S-CSCF) 1744. The P-CSCF 1742 is the MS's first point of contact with the IMS 1740. The P-CSCF 1742 forwards session initiation protocol (SIP) messages received from the MS to an SIP server in a home network (and vice versa) of the MS. The P-CSCF 1742 may also modify an outgoing request according to a set of rules defined by the network operator (for example, address analysis and potential modification).

The I-CSCF 1743 forms an entrance to a home network and hides the inner topology of the home network from other networks and provides flexibility for selecting an S-CSCF. The I-CSCF 1743 may contact a subscriber location function (SLF) 1745 to determine which HSS 1750 to use for the particular subscriber, if multiple HSS's 1750 are present. The S-CSCF 1744 performs the session control services for the MS 1702. This includes routing originating sessions to external networks and routing terminating sessions to visited networks. The S-CSCF 1744 also decides whether an application server (AS) 1752 is required to receive information on an incoming SIP session request to ensure appropriate service handling. This decision is based on information received from the HSS 1750 (or other sources, such as an application server 1752). The AS 1752 also communicates to a location server 1756 (e.g., a Gateway Mobile Location Center (GMLC)) that provides a position (e.g., latitude/longitude coordinates) of the MS 1702.

The HSS 1750 contains a subscriber profile and keeps track of which core network node is currently handling the subscriber. It also supports subscriber authentication and authorization functions (AAA). In networks with more than one HSS 1750, a subscriber location function provides information on the HSS 1750 that contains the profile of a given subscriber.

The MGCF 1746 provides interworking functionality between SIP session control signaling from the IMS 1740 and ISUP/BICC call control signaling from the external GSTN networks (not shown). It also controls the media gateway (MGW) 1748 that provides user-plane interworking functionality (e.g., converting between AMR- and PCM-coded voice). The MGW 1748 also communicates with other IP multimedia networks 1754.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A system, comprising:
a processor; and
a memory that stores executable instructions that, when executed by the processor, facilitate performance of operations, comprising:
facilitating interconnection of devices including interconnection of a circuit switched communication device of a circuit switched communication network with a non circuit switched-only communication device of a non circuit switched-only communication network via a network bridge device of the system, to form interconnected communication devices, wherein the network bridge device comprises a first interface for receipt of a non circuit-switched only voice signal and transmission of a converted non circuit-switched only voice signal, and a second interface for receipt of a circuit-switched voice signal and transmission of a converted circuit switched voice signal;
facilitating interconnection of a conference host device of a packet-switched communication network with the circuit switched communication device and with the non circuit switched-only communication device via the network bridge device;

obtaining current location data for the circuit switched communication device and providing current location indicator data to the conference host device and the non circuit switched-only communication device, for display of the current location data;

translating the non circuit-switched only voice signal received via the first interface into the converted circuit-switched voice signal transmitted via the second interface;

translating the circuit-switched voice signal received via the second interface into the converted non circuit-switched only voice signal transmitted via the first interface;

enabling host phone conference call control functions for interconnection of the conference host device, the circuit switched communication device and the non circuit switched-only communication device, wherein the host phone conference call control functions include a participant mute function;

receiving a mute selection signal from the conference host device associated with the circuit switched communication device;

maintaining a first transmission of first audio signals of the non circuit switched-only communication device over the first interface and interrupting a second transmission of second audio signals of the circuit switched communication device over the second interface in response to receiving the mute selection signal;

determining a compatibility of an auxiliary conference call function of auxiliary conference call functions of the system with the circuit switched communication device and the non circuit switched-only communication device; and enabling the auxiliary conference call function for a conference call in response to the compatibility of the auxiliary conference call function with an interconnected communication device of the interconnected communication devices being determined.

2. The system of claim 1, wherein the operations further comprise restoring the first transmission of the first audio signals of the non circuit switched-only communication device over the first interface or the second transmission of the second audio signals of the circuit switched communication device over the second interface in response to receiving an unmute signal from the conference host device.

3. The system of claim 1, wherein the translating occurs in response to receiving an incoming communication signal via the first interface or the second interface.

4. The system of claim 1, wherein the operations further comprise:

generating host phone conference call indicator data representative of the host phone conference call control functions and sending the host phone conference call indicator data to the non circuit switched-only communication device for display of the host phone conference call control functions at the non circuit switched-only communication device, in response to receiving a conference call transfer signal from the conference host device, enabling host phone conference call control functions exclusively for the non circuit switched-only communication device in response to receiving the conference call transfer signal; and maintaining the interconnection of devices in response to transferring the host phone conference call control functions.

5. The system of claim 1, wherein the operations further comprise receiving caller identification data for the circuit switched communication device and providing caller identification indicator data to the conference host device and to the non circuit switched-only communication device, for display of the caller identification data at the conference host device and at the non circuit switched-only communication device.

6. The system of claim 1, wherein the operations further comprise:

employing the auxiliary conference call function to control a conference call application function of the conference call.

7. A method of interconnecting communication devices to form a conference call, comprising:

initiating, by a system including a processor, a conference call communication bridge;

receiving, by the system, a call at the conference call communication bridge;

initiating, by the system, a first direct connection from the conference call communication bridge to a circuit-switched communication network interface of a circuit-switched communication network;

initiating, by the system, a second direct connection from the conference call communication bridge to a non circuit switched-only communication network interface of a non circuit switched-only communication network;

facilitating, by the system, interconnection of devices to yield interconnected communication devices including interconnection of circuit switched communication devices of the circuit-switched communication network and non circuit switched-only communication devices of the non circuit switched-only communication network, the non circuit switched-only communication devices comprising a conference call host device;

instructing, by the system, the conference call communication bridge to translate signals between the circuit switched communication network interface and the non circuit switched-only communication network interface;

distributing, by the system, a voice and data communication to an interconnected communication device of the interconnected communication devices;

detecting, by the system, a disconnected device of the conference call host device, the circuit switched communication devices and the non circuit switched-only communication devices that has disconnected from the conference call communication bridge;

determining, by the system, whether the disconnected device was the conference call host device;

maintaining, by the system, the interconnected communication devices comprising the interconnection of circuit switched communication devices of the circuit-switched communication network and non circuit switched-only communication devices of the non circuit switched-only communication network in response to determining the disconnected device was the conference call host device;

transferring, by the system, a conference call host function initiated by the conference call host device to one of the non circuit switched-only communication devices in response to determining the disconnected device was the conference call host device, querying, by the system, the one of the non circuit switched-only communication devices to determine compatibility with an auxiliary function of an auxiliary function set;

updating, by the system, user interface indicator data to indicate compatibility of the auxiliary function of the auxiliary function set with the one of the non circuit switched-only communication devices; and transmitting, by the system, the user interface indicator data to the one of the non circuit switched-only communication devices.

8. The method of claim 7, further comprising querying, by the system, a connected communication device of the circuit switched communication devices and the non circuit switched-only communication devices that has not been detected to have become disconnected for name and location information associated with the connected communication device.

9. The method of claim 7, further comprising querying, by the system, a network location server associated with the one of the non circuit switched-only communication devices for name and location information associated with the one of the non circuit switched-only communication devices.

10. The method of claim 7, further comprising:
querying, by the system, a conference application server;
obtaining, by the system, the auxiliary function set from the conference application server; and
activating, by the system, the auxiliary function of the auxiliary function set for the one of the non circuit switched-only communication device through the conference application server by way of the conference call communication bridge.

11. The method of claim 7, further comprising:
forming a query, by the system, to determine whether the disconnected device was inadvertently disconnected based on a result received in response to the query; and
re-connecting, by the system, the disconnected device to the conference call communication bridge based on the result of the query indicating an inadvertent disconnection of the disconnected device.

12. The method of claim 7, wherein the one of the non circuit switched-only communication devices is a packet switched communication device.

13. A machine-readable storage medium, comprising executable instructions that, when executed by a processor facilitate performance of operations, comprising:
facilitating interconnecting of communication devices resulting in interconnected communication devices including facilitating interconnection of a circuit switched communication device with a non circuit switched-only communication device;
receiving an auxiliary function set from a conference application server in response to a first query;
determining a compatibility of an interconnected communication device of the interconnected communication devices with an auxiliary function of the auxiliary function set from data included in a response to a second query to the interconnected communication device;
updating user interface indicator data associated with the interconnected communication device in response to the compatibility with the auxiliary function being determined;
transmitting the user interface indicator data to the interconnected communication device in response to the updating;

facilitating activation of a conference host function for the non circuit switched-only communication device, the conference host function comprising a mute function;
receiving a mute selection signal associated with the circuit switched communication device from the non circuit switched-only communication device;
interrupting a first transmission of first audio signals of the circuit switched communication device for the interconnected communication devices in response to receiving the mute selection signal and maintaining a second transmission of second audio signals of the non circuit switched-only communication device in response to receiving the mute selection signal; and
obtaining current location data for the circuit switched-only communication device and providing current location indicator data to the non circuit switched-only communication device, for display of the current location data.

14. The machine-readable storage medium of claim 13, wherein the operations further comprise detecting an inadvertent disconnection of a communication device of the interconnected communication devices.

15. The machine-readable storage medium of claim 14, wherein the operations further comprise reconnecting the communication device of the interconnected communication devices in response to the detecting the inadvertent disconnection.

16. The machine-readable storage medium of claim 13, wherein the operations further comprise transmitting updated status information of the interconnected communication devices to the non circuit switched-only communication device.

17. The machine-readable storage medium of claim 13, wherein the operations further comprise sending application data representing an auxiliary communication application to the non circuit switched-only communication device.

18. The machine-readable storage medium of claim 13, wherein the operations further comprise sending application data representing an application to the non circuit switched-only communication device in response to initiation of the application by way of a second host function by the non circuit switched-only communication device.

19. The machine-readable storage medium of claim 17, wherein the operations further comprise querying the interconnected communication devices and determining whether the non circuit switched-only communication device is compatible with the auxiliary communication application.

20. The machine-readable storage medium of claim 14, wherein the operations further comprise directing user interface information to a connected communication device of the interconnected communication devices determined not to have become disconnected, wherein the user interface information indicates a status of the connected communication devices.

21. The machine-readable storage medium of claim 13, wherein the operations further comprise initiating and maintaining a sidebar channel between a plurality of the interconnected communication devices and maintaining and distributing a primary voice communication to the circuit switched communication device and the non circuit switched-only communication device.

22. The system of claim 1, wherein the operations further comprise:
acquiring caller identification information for the circuit switched-only communication device;
accessing a caller ID to location device utilizing the caller identification information; and receiving the current location data for the circuit switched-only communication device from the caller ID to location device in response to the caller identification information.

23. The machine-readable storage medium of claim 13, wherein the operations further comprise:
acquiring caller identification information for the circuit switched-only communication device;
accessing a caller ID to location device utilizing the caller identification information; and
receiving the current location data for the circuit switched-only communication device from the caller ID to location device in response to the caller identification information.

\* \* \* \* \*